US008053539B2

(12) United States Patent
Nakamura et al.

(10) Patent No.: US 8,053,539 B2
(45) Date of Patent: Nov. 8, 2011

(54) SILOXANYL MATERIALS FOR MOLDED PLASTICS

(75) Inventors: Masataka Nakamura, Shiga (JP); Kazuhiko Fujisawa, Shiga (JP); Mitsuru Yokota, Shiga (JP)

(73) Assignees: Johnson & Johnson Vision Care Inc., Jacksonville, FL (US); Toray Industries Inc., Tokyo (JP)

( * ) Notice: Subject to any disclaimer, the term of this patent is extended or adjusted under 35 U.S.C. 154(b) by 301 days.

(21) Appl. No.: 11/609,677

(22) Filed: Dec. 12, 2006

(65) Prior Publication Data

US 2008/0004401 A1 Jan. 3, 2008

Related U.S. Application Data

(60) Provisional application No. 60/817,974, filed on Jun. 30, 2006.

(51) Int. Cl.
C08F 30/08 (2006.01)
C08G 77/60 (2006.01)
C08G 77/04 (2006.01)

(52) U.S. Cl. ............................. 526/279; 528/35; 528/37

(58) Field of Classification Search .................. 526/279; 528/35
See application file for complete search history.

(56) References Cited

U.S. PATENT DOCUMENTS

| 2,793,223 | A | 5/1957 | Merker |
| 2,956,044 | A | 10/1960 | Merker |
| 3,001,975 | A | 9/1961 | Beavers et al. .............. 526/273 |
| 3,057,902 | A | 10/1962 | Pike |
| 3,563,742 | A | 2/1971 | Phlipot et al. ..................... 96/28 |
| 3,699,081 | A | 10/1972 | Iwashita et al. ................... 564/4 |
| T0,908,001 | I4 | 3/1973 | Besser .............................. 560/4 |
| 3,756,820 | A | 9/1973 | Hayakawa et al. |
| 3,859,320 | A | 1/1975 | Atherton |
| 3,865,588 | A | 2/1975 | Ohto et al. |
| 3,959,358 | A | 5/1976 | Jursich |
| 4,117,001 | A | 9/1978 | Fozzard |
| 4,120,570 | A | 10/1978 | Gaylord ........................... 351/40 |
| 4,139,692 | A | 2/1979 | Tanaka et al. ................... 526/218 |
| 4,144,137 | A | 3/1979 | Stewart ............................. 203/65 |
| 4,235,985 | A * | 11/1980 | Tanaka et al. ................... 526/279 |
| 4,259,467 | A | 3/1981 | Keogh et al. ................... 526/279 |
| 4,260,725 | A | 4/1981 | Keogh et al. ................... 526/279 |
| 4,395,496 | A | 7/1983 | Wittmann et al. |
| 4,402,887 | A | 9/1983 | Kuriyama et al. |
| 4,463,149 | A | 7/1984 | Ellis |
| 4,563,538 | A | 1/1986 | Wakabayashi et al. |
| 4,632,968 | A * | 12/1986 | Yokota et al. ................... 526/279 |
| 4,853,453 | A | 8/1989 | Schafer et al. ................... 528/28 |
| 4,861,850 | A | 8/1989 | Novicky |
| 5,010,141 | A | 4/1991 | Mueller ........................... 525/276 |
| 5,045,233 | A | 9/1991 | Kita et al. |
| 5,045,621 | A | 9/1991 | Suzuki et al. ..................... 528/14 |
| 5,057,578 | A | 10/1991 | Spinelli ........................... 525/278 |
| 5,079,319 | A | 1/1992 | Mueller .................... 526/238.23 |
| 5,128,484 | A | 7/1992 | Kita et al. |
| 5,219,965 | A | 6/1993 | Valint, Jr. et al. .............. 526/245 |
| 5,314,960 | A | 5/1994 | Spinelli et al. ................... 525/280 |
| 5,321,108 | A | 6/1994 | Kunzler et al. ................. 526/242 |
| 5,329,034 | A | 7/1994 | Nagase et al. |
| 5,336,797 | A | 8/1994 | McGee et al. ................... 556/419 |
| 5,371,147 | A | 12/1994 | Spinelli et al. ................... 525/288 |
| 5,387,662 | A | 2/1995 | Kunzler et al. ................. 526/245 |
| 5,387,663 | A | 2/1995 | McGee et al. ................... 526/279 |
| 5,470,930 | A | 11/1995 | Toba et al. ....................... 526/204 |
| 5,481,015 | A | 1/1996 | Nomura |
| 5,493,039 | A | 2/1996 | Okawa et al. |
| 5,510,428 | A | 4/1996 | Harano et al. .................. 525/438 |
| 5,539,016 | A | 7/1996 | Kunzler et al. ................. 523/107 |
| 5,554,706 | A | 9/1996 | Nagase et al. |
| 5,563,184 | A | 10/1996 | McGee et al. ................... 523/107 |
| 5,610,252 | A | 3/1997 | Bambury et al. ............... 526/279 |
| 5,831,110 | A | 11/1998 | Isoda et al. |
| 5,888,356 | A | 3/1999 | Keil et al. |
| 5,891,977 | A | 4/1999 | Dietz et al. |
| 5,962,548 | A | 10/1999 | Vanderlaan et al. |
| 5,994,488 | A | 11/1999 | Yokota et al. |

(Continued)

FOREIGN PATENT DOCUMENTS

BR 7403534 4/1974

(Continued)

OTHER PUBLICATIONS

International Search Report for PCT/US2007/015264 filed Jun. 28, 2007.
Künzler, "Silicone Hydrogels for Contact Lens Application," *Trends in Polymer Science*, 4(2):52-59 (1996).
Lai, "Role of Bulky Polysiloxanylalkyl Methacrylates in Oxygen-Permeable Hydrogel Materials," *Journal of Applied Polymer Science*, 56(3):317-324 (1995).
Adams, et al., "Metal Segregation in Bimetallic Clusters and Its Possible Role in Synergism and Bifunctional Catalysis," 2000, Journal of Organometallic Chemistry, vol. 600, p. 1-6.

(Continued)

*Primary Examiner* — Ling Choi
*Assistant Examiner* — Chun-Cheng Wang
(74) *Attorney, Agent, or Firm* — Ballard Spahr LLP

(57) ABSTRACT

In one aspect, the invention relates to compositions comprising siloxanyl compounds comprising the structure:

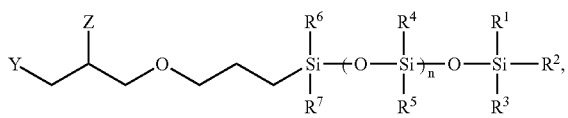

or residues thereof. Such compositions can be suitable for producing molded articles, can be excellent in transparency, hydrophilicity, and oxygen permeability, and can have a low modulus of elasticity and/or an excellent optical quality, so as to be suitable for ophthalmic lenses such as contact lenses and intraocular lenses. This abstract is intended as a scanning tool for purposes of searching in the particular art and is not intended to be limiting of the present invention.

12 Claims, 2 Drawing Sheets

U.S. PATENT DOCUMENTS

| | | | |
|---|---|---|---|
| 6,031,059 A | 2/2000 | Vanderlaan et al. | |
| 6,177,585 B1 | 1/2001 | Chen et al. | 556/479 |
| 6,180,741 B1 | 1/2001 | Yamaguchi et al. | 526/301 |
| 6,218,503 B1 | 4/2001 | Lai et al. | 528/320 |
| 6,306,992 B1 | 10/2001 | Yoshitake et al. | 526/279 |
| 6,334,935 B1 | 1/2002 | Uehara et al. | 203/8 |
| 6,344,495 B1 | 2/2002 | Ueda et al. | |
| 6,350,816 B1 | 2/2002 | Farronato et al. | |
| 6,372,815 B1 | 4/2002 | Sule et al. | 523/106 |
| 6,617,373 B2 | 9/2003 | Sule et al. | 523/108 |
| 6,649,722 B2 | 11/2003 | Rosenzweig et al. | |
| 6,783,897 B2 | 8/2004 | Kang et al. | |
| 6,787,615 B2 | 9/2004 | Keller et al. | |
| 6,822,016 B2 | 11/2004 | McCabe et al. | |
| 6,846,892 B2 | 1/2005 | Kindt-Larsen et al. | 526/320 |
| 6,922,118 B2 | 7/2005 | Kubena et al. | 333/188 |
| 6,933,401 B2 | 8/2005 | Molock et al. | |
| 7,169,874 B2 | 1/2007 | Salamone et al. | |
| RE39,635 E | 5/2007 | Vanderlaan et al. | |
| 7,317,117 B2 | 1/2008 | Nakamura et al. | |
| 7,368,589 B2 | 5/2008 | Mahadevan et al. | |
| 7,461,937 B2 | 12/2008 | Steffan et al. | |
| 2002/0016383 A1 | 2/2002 | Iwata et al. | 523/106 |
| 2003/0109661 A1 | 6/2003 | Salamone et al. | 528/25 |
| 2003/0130465 A1 | 7/2003 | Lai et al. | 528/25 |
| 2004/0014921 A1 | 1/2004 | Fujisawa et al. | |
| 2004/0114101 A1 | 1/2004 | Thakrar | |
| 2004/0106694 A1* | 6/2004 | Fujisawa et al. | 523/106 |
| 2004/0198916 A1 | 10/2004 | Nakamura et al. | |
| 2004/0198938 A1 | 10/2004 | Nakamura et al. | |
| 2004/0201820 A1 | 10/2004 | Nakamura et al. | |
| 2004/0249180 A1 | 12/2004 | Nakamura et al. | |
| 2005/0165246 A1 | 7/2005 | Lai et al. | 556/413 |
| 2005/0237483 A1 | 10/2005 | Phelan | |
| 2006/0007391 A1 | 1/2006 | McCabe et al. | |
| 2006/0036052 A1 | 2/2006 | Kindt-Larsen et al. | 526/320 |
| 2006/0047134 A1 | 3/2006 | Molock et al. | |
| 2006/0223964 A1 | 10/2006 | Lai et al. | 528/32 |
| 2006/0229423 A1 | 10/2006 | Parakka et al. | |
| 2007/0203275 A1 | 8/2007 | Kikuchi et al. | |
| 2008/0004383 A1 | 1/2008 | Nakamura et al. | |
| 2008/0004401 A1 | 1/2008 | Nakamura et al. | |
| 2008/0143003 A1 | 1/2008 | Phelan | |
| 2008/0081850 A1 | 4/2008 | Fujisawa et al. | |
| 2008/0081894 A1 | 4/2008 | Fujisawa et al. | |
| 2008/0119627 A1 | 5/2008 | Nakamura et al. | |
| 2009/0156708 A1 | 6/2009 | Lai et al. | 523/107 |

FOREIGN PATENT DOCUMENTS

| | | |
|---|---|---|
| EP | 0 639 576 | 2/1995 |
| EP | 0 733 637 | 9/1996 |
| EP | 0 753 521 | 1/1997 |
| EP | 0 965 593 | 12/1999 |
| EP | 1 123 915 | 8/2001 |
| EP | 1 386 924 | 2/2004 |
| EP | 1 403 396 | 3/2004 |
| EP | 1 426 809 A1 | 6/2004 |
| EP | 1 719 776 | 11/2006 |
| EP | 1 749 812 | 2/2007 |
| EP | 07 874 059 | 6/2007 |
| EP | 07 838 814 | 9/2007 |
| EP | 07838800 | 9/2007 |
| EP | 08772142.9 | 6/2008 |
| GB | 1 364 360 | 8/1974 |
| JP | 55-015110 | 2/1980 |
| JP | 56-22325 * | 3/1981 |
| JP | 56-022325 | 3/1981 |
| JP | 63-301919 | 8/1988 |
| JP | 63 216044 | 9/1988 |
| JP | 04-077489 | 3/1992 |
| JP | 06-032791 | 2/1994 |
| JP | 08-283342 | 10/1996 |
| JP | 2001048939 | 2/2001 |
| JP | 2004115790 | 4/2004 |
| JP | 2006036757 | 2/2006 |
| WO | WO/96/31792 | 10/1996 |
| WO | WO/01/71392 | 9/2001 |
| WO | WO/02/081532 | 10/2002 |
| WO | WO 03/014130 | 2/2003 |
| WO | WO 03/021336 | 3/2003 |
| WO | WO/03/022322 | 3/2003 |
| WO | WO 03/027123 | 4/2003 |
| WO | WO/03/040193 | 5/2003 |
| WO | WO/03/043668 | 5/2003 |
| WO | WO/03/066688 | 8/2003 |
| WO | WO/03/077792 | 9/2003 |
| WO | WO/2005/115958 | 5/2004 |
| WO | WO 2005/005368 | 1/2005 |
| WO | WO 2005/005445 | 1/2005 |
| WO | WO 2005/044829 | 5/2005 |
| WO | WO/2005/090364 | 9/2005 |
| WO | WO 2008/005398 | 1/2008 |
| WO | WO/2008/005398 | 1/2008 |
| WO | PCT/US2008/068544 | 6/2008 |

OTHER PUBLICATIONS

U.S. Appl. No. 11/609,724, filed Dec. 12, 2006, Nakamura, Final Rejection mailed by the PTO on Nov. 9, 2009.

U.S. Appl. No. 11/561,456, filed Nov. 20, 2006, Fujisawa, Non-Final Rejection mailed by the PTO on Oct. 27, 2009.

U.S. Appl. No. 11/681,406, filed Mar. 2, 2007, Nakamura, Response to the Final Rejection mailed by the PTO on Jul. 6, 2009.

Fortuniak, "Controlled Synthesis of Siloxan Polymers and Siloxan-Siloxane Block Copolymers with 3-Chloropropyl Groups Pendat to the Siloxane Chain," Macromol. Chem. Phys. 2001, 202, 2306-2313.

Gaylord, "Composition for Manufacturing Contact Lenses," Accession No. 1976:578430, based on Brazilian Patent No. 7403534.

HQMME Product Literature, Eastman Chemicals website, http://www.eastman.com/Literature_Center/D/D162.pdf, last accessed (Jun. 29, 2009).

Material Safety Data Sheet of 2-Ethylhexyl acrylate, Japan Petrochemical Industry Association, May 25, 1986 (revised in Aug. 2001), p. 4-5, Item 10,11.1-10, available at http://www.jpca.or.jp/61msds/j7cb32.htm (accessed Jul. 17, 2008).

PCT/US2008/088287, Dec. 24, 2008, Fujisawa, Written Opinion, dated Apr. 28, 2009.

PCT/US2008/088287, Dec. 24, 2008, Fujisawa, International Search Report, dated Apr. 28, 2009.

U.S. Appl. No. 11/609,724, filed Dec. 12, 2006, Nakamura, Admendment received in the PTO on Apr. 15, 2010.

U.S. Appl. No. 11/771,999, filed Jun. 29, 2007, Fujisawa, Final Rejection mailed by the PTO on Mar. 24, 2010.

U.S. Appl. No. 12/060,536, filed Apr. 1, 2008, Fujisawa, Non-Final Rejection mailed by the PTO on Mar. 18, 2010.

U.S. Appl. No. 11/561,456, filed Nov. 20, 2006, Fujisawa, Amendment received in the PTO on Feb. 24, 2010.

U.S. Appl. No. 11/561,456, filed Nov. 20, 2006, Fujisawa, Final Rejection mailed by the PTO on May 26, 2010.

U.S. Appl. No. 11/561,456, flied Nov. 20, 2006, Fujisawa, Amendment received in the PTO on Jun. 28, 2010.

U.S. Appl. No. 11/561,456, filed Nov. 20, 2006, Fujisawa, Notice of Allowance Issued Jul. 8, 2010.

U.S. Appl. No. 11/561,525, filed Nov. 20, 2006, Fujisawa, Amendment received in the PTO on Feb. 16, 2010.

U.S. Appl. No. 11/561,525, filed Nov. 20, 2006, Fujisawa, Final Rejection mailed by the PTO on May 24, 2010.

U.S. Appl. No. 11/681,406, filed Mar. 2, 2007, Nakamura, Non-Final Rejection mailed by the PTO on Feb. 4, 2010.

U.S. Appl. No. 11/771,999, filed Jun. 29, 2007, Fujisawa, Amendment received in the PTO on Feb. 1, 2010.

U.S. Appl. No. 11/561,525, filed Nov. 20, 2006, Fujisawa, Office Action mailed Jan. 4, 2011.

U.S. Appl. No. 11/609,724, filed Dec. 12, 2006, Nakamura, Response to Office Action mailed Sep. 2, 2010.

U.S. Appl. No. 11/609,724, filed Dec. 12, 2006, Nakamura, Final Rejection mailed Mar. 29, 2011.

U.S. Appl. No. 12/901,191, filed Oct. 8, 2010, Fujisawa, Office Action mailed Apr. 27, 2011.

U.S. Appl. No. 11/771,999, filed Jun. 29, 2007, Fujisawa, Response to Office Action mailed Oct. 15, 2010.

U.S. Appl. No. 11/771,999, filed Jun. 29, 2007, Fujisawa, Final Rejection Action mailed Apr. 1, 2011.
U.S. Appl. No. 11/609,724, filed Dec. 12, 2006, Nakamura, Office Action mailed Sep. 2, 2010.
U.S. Appl. No. 11/561,525, filed Nov. 20, 2006, Fujisawa, Response to final Office Action mailed May 24, 2010.
U.S. Appl. No. 11/771,999, filed Jun. 29, 2007, Fujisawa, Office Action mailed Oct. 15, 2010.
U.S. Appl. No. 12/060,536, filed Apr. 1, 2008, Fujisawa, Response to Office Action mailed Mar. 18, 2010.
U.S. Appl. No. 12/060,536, filed Apr. 1, 2008, Fujisawa, Notice of Allowance mailed Oct. 19, 2010.
International Search Report for International Application No. PCT/US2007/020668 (mailed Jan. 25, 2008).
International Search Report for International Application No. PCT/US2007/020683 (mailed Jan. 25, 2008).
International Search Report for International Application No. PCT/US2007/024325 (mailed Apr. 24, 2008).
Hirabayashi et al., "A facile preparation and cyclopropanation of 1-alkenylsilanols," *Bulletin of the Chemical Society of Japan*, 71(10):2409-2417.
Kawakami et al., "Synthesis and characterization of liquid crystalline polystyrenes with disiloxane linkage in the spacer," *Polymer Bulletin (Berlin)*, 36(6):653-658 (1996).
Plueddemann et al., "Epoxyorganosilozanes," *J. Am. Chem Soc.*, 81:2632-2635 (1959).
Volkova et al., "Reaction of dimethylsiloxacyclohexane with methacrylic acid and triethylsilanol: Synthesis of [(mehtacryloyloxy)butyl]dimethyl(triethylsiloxy)silane," *Zhurnal Obshchei Khimii*, 58(9):2145-2148 (1988).
U.S. Appl. No. 11/561,525, filed Nov. 20, 2006, Fujisawa, Response to Office Action mailed Jan. 4, 2011.
U.S. Appl. No. 11/771,999, filed Jun. 29, 2007, Fujisawa, Response to Office Action mailed Apr. 1, 2011.
U.S. Appl. No. 11/771,999, filed Jun. 29, 2007, Fujisawa, Notice of Allowance mailed.

* cited by examiner

SILOXANYL MATERIALS FOR MOLDED PLASTICS

CROSS REFERENCE TO RELATED APPLICATIONS

This application claims the benefit of U.S. Application No. 60/817,974 filed Jun. 30, 2006, which is hereby incorporated herein by reference in its entirety.

BACKGROUND

Acryloyl-functionalized linear polydimethylsiloxanes can have a satisfactory oxygen permeability yet suffer from hydrophobicity, thereby repelling water and increasing the incidence of corneal staining. That is, introduction of a siloxanyl group for the purpose of increasing oxygen permeability can negatively impact other properties of the composition. Further, when an acryloyl-functionalized polydimethylsiloxane is copolymerized with a hydrophilic monomer (e.g., 2-hydroxyethyl(meth)acrylate) in order to increase the hydrophilicity, phase separation can occur due to the static repulsion between the polar hydroxyl group and the nonpolar siloxanyl group, so that a transparent polymer cannot be obtained. Accordingly, such compositions can have poor optical quality.

Therefore, there remains a need for methods and compositions that overcome these deficiencies and that effectively attain a satisfactory balance between oxygen permeability and hydrophilicity.

SUMMARY

As embodied and broadly described herein, the invention, in one aspect, relates to compositions comprising siloxanyl compounds comprising the structure:

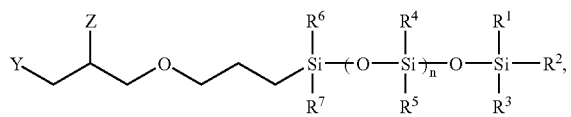

or residues thereof. Such compositions can be suitable for producing molded articles, can be excellent in transparency, hydrophilicity, and oxygen permeability, and can have a low modulus of elasticity and/or an excellent optical quality, so as to be suitable for ophthalmic lenses such as contact lenses and intraocular lenses.

In a further aspect, the invention relates to methods for producing siloxanyl compounds and compositions.

In a yet further aspect, the invention relates to the products of the disclosed methods.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this specification, illustrate several embodiments and together with the description illustrate the disclosed compositions and methods.

DETAILED DESCRIPTION

Figure 1:
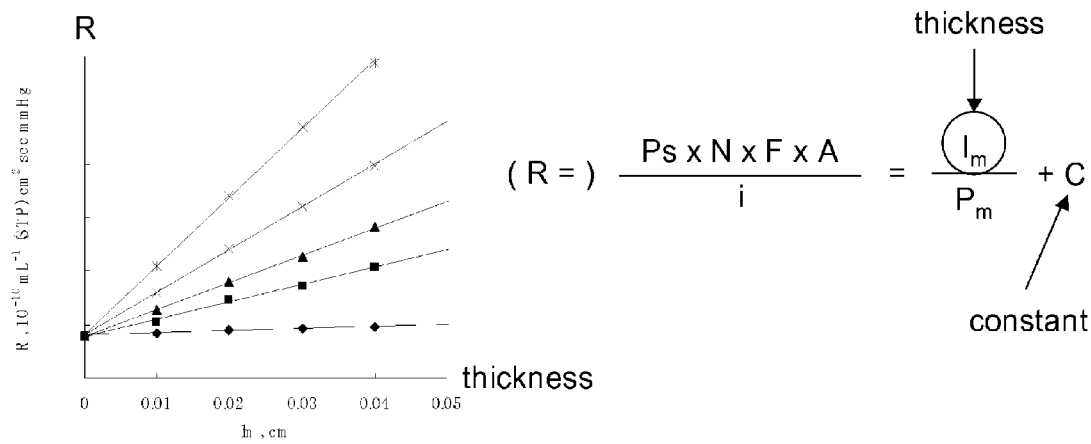
FIG. 1 shows a plot of R (1/Q) versus thickness (1 m).

The present invention can be understood more readily by reference to the following detailed description of the invention and the Examples included therein.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which may need to be independently confirmed.

A. Definitions

As used in the specification and the appended claims, the singular forms "a," "an" and "the" include plural referents unless the context clearly dictates otherwise. Thus, for example, reference to "a component," "a polymer," or "a residue" includes mixtures of two or more such components, polymers, or residues, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the terms "optional" or "optionally" means that the subsequently described event or circumstance may or may not occur, and that the description includes instances where said event or circumstance occurs and instances where it does not.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. Unless explicitly disclosed, this disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "A$^1$," "A$^2$," "A$^3$," and "A$^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, for example 1 to 12 carbon atoms or 1 to 6 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "polyalkylene group" as used herein is a group having two or more CH$_2$ groups linked to one another. The polyalkylene group can be represented by the formula —(CH$_2$)$_a$—, where "a" is an integer of from 2 to 500.

The terms "alkoxy" and "alkoxyl" as used herein to refer to an alkyl or cycloalkyl group bonded through an ether linkage; that is, an "alkoxy" group can be defined as —OA$^1$ where A$^1$ is alkyl or cycloalkyl as defined above. "Alkoxy" also includes polymers of alkoxy groups as just described; that is, an alkoxy can be a polyether such as —OA$^1$-OA$^2$ or —OA$^1$-(OA$^2$)$_a$-OA$^3$, where "a" is an integer of from 1 to 200 and A$^1$, A$^2$, and A$^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as (A$^1$A$^2$)C=C(A$^3$A$^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula $NA^1A^2A^3$, where $A^1$, $A^2$, and $A^3$ can be, independently, hydrogen or substituted or unsubstituted alkyl, cycloalkyl, alkenyl, cycloalkenyl, alkynyl, cycloalkynyl, aryl, or heteroaryl group as described herein.

The term "carboxylic acid" as used herein is represented by the formula —C(O)OH.

The term "ester" as used herein is represented by the formula —OC(O)$A^1$ or —C(O)O$A^1$, where $A^1$ can be a substituted or unsubstituted alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "hydroxyl" as used herein is represented by the formula —OH.

The term "ketone" as used herein is represented by the formula $A^1C(O)A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein.

The term "azide" as used herein is represented by the formula —$N_3$.

The term "nitro" as used herein is represented by the formula —$NO_2$.

The term "nitrile" as used herein is represented by the formula —CN.

The term "silyl" as used herein is represented by the formula —Si$A^1A^2A^3$, where $A^1$, $A^2$, and $A^3$ can be, independently, hydrogen or a substituted or unsubstituted alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —S(O)$A^1$, —S(O)$_2A^1$, —OS(O)$_2A^1$, or —OS(O)$_2$O$A^1$, where $A^1$ can be hydrogen or a substituted or unsubstituted alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —S(O)$_2A^1$, where $A^1$ can be hydrogen or a substituted or unsubstituted alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein.

The term "thiol" as used herein is represented by the formula —SH.

As used herein, the term "siloxanyl" refers to a structure having at least one Si—O—Si bond. Thus, for example, siloxanyl group means a group having at least one Si—O—Si moiety, and siloxanyl compound means a compound having at least one Si—O—Si group.

As used herein, the term "alkylacrylic acid" refers to acrylic acid, alkyl-substituted acrylic acids, salts thereof, and derivatives thereof. In one aspect, an alkylacrylic acid can be further substituted. In a further aspect, an alkylacrylic acid is methacrylic acid.

As used herein, the term "hydrolyzable group" refers to a group or moiety which is convertible to hydrogen by hydrolysis or solvolysis. In one aspect, a hydrolyzable group can be hydrolyzed (i.e., converted to a hydrogen group) by exposure to water or a protic solvent at or near ambient temperature and at or near atmospheric pressure. In further aspects, a hydrolyzable group can be hydrolyzed by exposure to water or a protic solvent at an elevated temperature or an elevated pressure. In further aspects, a hydrolyzable group can be hydrolyzed by exposure to acidic or alkaline water or acidic or alkaline protic solvent.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Siloxanyl-Containing Compositions

In one aspect, the invention relates to compositions comprising a siloxanyl compound comprising the structure:

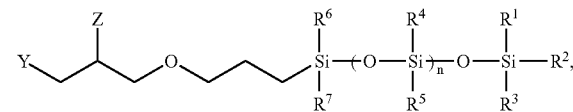

wherein $R^1$ to $R^7$ independently represent hydrogen, $C_1$-$C_{18}$ alkyl, or phenyl; wherein n represents an integer of 0 or more; wherein the mode of the integer is from about 2 to about 9; wherein the molar percentage of the compound in which n is from 2 to 9 in the total material is at least about 90%; wherein Y is hydroxyl or hydrolyzable substituted hydroxyl, and Z is alkylacryloyloxy; or Z is hydroxyl or hydrolyzable substituted hydroxyl, and Y is alkylacryloyloxy; or Y and Z are 0 and form an epoxy ring.

In a further aspect, the compositions comprise at least two siloxanyl compounds and at least a portion of the compounds are cross-linked. In a yet further aspect, the cross-linked compounds form a polymer.

1. Epoxide-Functionalized Compounds

In one aspect, the compound comprises the structure:

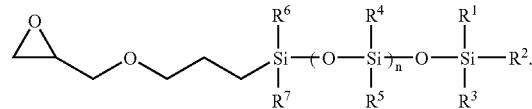

In a further aspect, $R^1$ represents n-butyl and wherein $R^2$ to $R^7$ independently represent $C_1$-$C_4$ alkyl. In a yet further aspect, $R^1$ represents n-butyl and wherein $R^2$ to $R^7$ independently represent methyl.

In a yet further aspect, the compositions of the invention are substantially free from epoxide-functionalized compounds. That is, in one aspect, epoxide-functionalized compounds are substantially absent from the compositions of the invention.

For example, the compositions can be a material which comprises a siloxanyl compound represented by the Formula (A1):

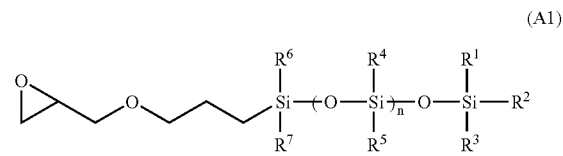

wherein $R^1$ to $R^7$ independently represent hydrogen, $C_1$-$C_{18}$ alkyl or phenyl; and n represents an integer of 0 or more; the mode of said integer "n" being not less than 2 and not more than 9; the percentage of said siloxanyl compound represented by the Formula (A1), in which the integer "n" is the mode, in the total of said siloxanyl compound represented by the Formula (A1) being not less than 90%; and the content of said siloxanyl compound represented by the Formula (A1) in said material being not less than 92%.

In Formula (A1), $R^1$ to $R^7$ independently represent hydrogen, $C_1$-$C_{18}$ alkyl or phenyl. $R^1$ is preferably hydrogen, methyl, ethyl, propyl, butyl, pentyl, hexyl, 2-ethylhexyl, octyl, decyl, undecyl, dodecyl, octadecyl, cyclopentyl, cyclohexyl, benzyl, or phenyl. From the viewpoint of the chemical stability of the molded plastics obtained, methyl, ethyl, propyl, and butyl are preferred.

$R^2$ to $R^7$ are preferably hydrogen, methyl, ethyl, propyl, butyl, pentyl, hexyl, 2-ethylhexyl, octyl, decyl, undecyl, dodecyl, octadecyl, cyclopentyl, cyclohexyl, benzyl, or phenyl. From the viewpoint of oxygen permeability, hydrophilicity, and resistance to breakage of the molded plastics obtained, methyl is especially preferred.

"n" represents an integer of 0 or more. Because of the oxygen permeability, hydrophilicity and resistance to breakage of the molded plastics obtained, the mode of "n" described in detail below is typically not less than 2 and not more than 9. "n" is preferably an integer of 2 to 8, more preferably 3 to 6.

2. Acryloyl-Functionalized Compounds

In one aspect, the compound comprises the structure:

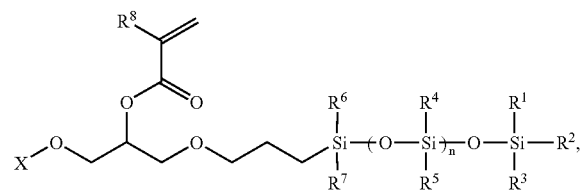

wherein X is hydrogen or a hydrolyzable group; and wherein $R^8$ is hydrogen, methyl, or $C_2$-$C_4$ alkyl. In a further aspect, $R^1$ represents n-butyl and wherein $R^2$ to $R^7$ independently represent $C_1$-$C_4$ alkyl. In a yet further aspect, $R^1$ represents n-butyl and wherein $R^2$ to $R^7$ independently represent methyl.

In one aspect, the compound comprises the structure:

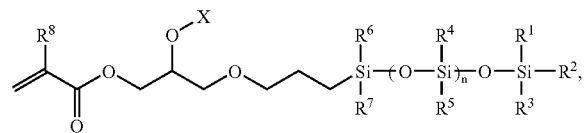

wherein X is hydrogen or a hydrolyzable group; and wherein $R^8$ is hydrogen, methyl, or $C_2$-$C_4$ alkyl. In a further aspect, $R^1$ represents n-butyl and wherein $R^2$ to $R^7$ independently represent $C_1$-$C_4$ alkyl. In a yet further aspect, $R^1$ represents n-butyl and wherein $R^2$ to $R^7$ independently represent methyl.

For example, the composition can be a material which comprises a siloxanyl compound represented by the Formula (A2-1) or (A2-2):

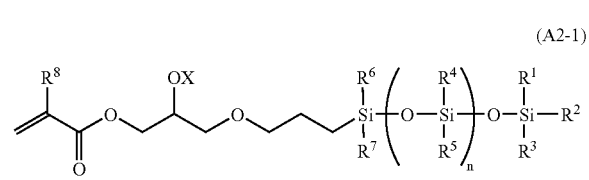

(A2-1)

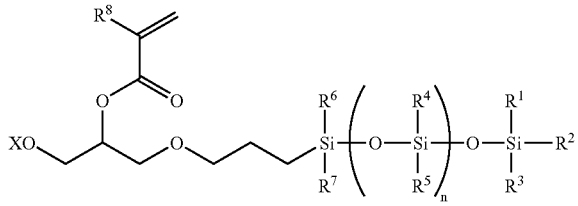

(A2-2)

wherein $R^1$ to $R^7$ independently represent hydrogen, $C_1$-$C_{18}$ alkyl or phenyl; n represents an integer of 0 or more; $R^8$ represents hydrogen or methyl; and X represents hydrogen or a hydrolyzable group; the mode of said integer "n" being not less than 2 and not more than 9; the percentage the total of said siloxanyl compounds represented by the Formula (A2-1) and (A2-2) in which the integer "n" is the mode, in the total of said siloxanyl compounds represented by the Formula (A2-1) and (A2-2) being not less than 90%; and the total content of said siloxanyl compounds represented by the Formula (A2-1) and (A2-2), respectively, in said material being not less than 92%.

In Formulae (A2-1) and (A2-2), $R^1$ to $R^7$ independently represent hydrogen, $C_1$-$C_{18}$ alkyl or phenyl. Preferred examples of $R^1$ are the same as those of $R^1$ in Formula (A1), and preferred examples of $R^2$ to $R^7$ are the same as those of $R^2$ to $R^7$ in Formula (A1). "n" represents an integer of 0 or more. Because of the oxygen permeability, hydrophilicity and resistance to breakage of the molded plastics obtained, the mode of "n" described in detail below is typically not less than 2 and typically not more than 9. A preferred range of "n" is also the same as that of the "n" in Formula (A1).

$R^8$ represents hydrogen or methyl, and methyl is preferred in view of chemical stability.

X represents hydrogen or a hydrolyzable group. Preferred examples of X include hydrogen; pyranyl; alkyl groups such as methyl and t-butyl; acyl groups such as acetyl, formyl and propionyl; and silyl groups such as trimethylsilyl and t-butyldimethylsilyl. In cases where "X" is a hydrolyzable group, it is preferably an acyl or silyl, and most preferably silyl, from the viewpoint that it may easily be converted to hydroxyl group by hydrolysis or solvolysis.

It is also understood that the compound can be provided as:

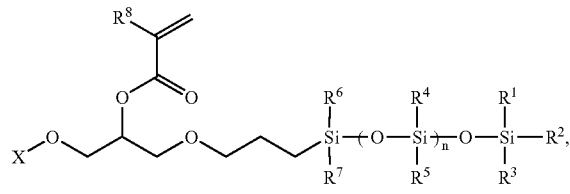

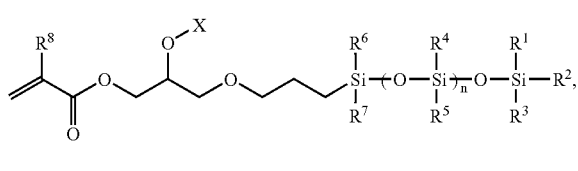

or a mixture thereof, in the compositions of the invention.

3. Properties

In one aspect, a material for producing molded plastics, can have a structure comprising a siloxanyl group, which is hydrophobic, and a hydroxyl group, which is hydrophilic, or a hydroxyl group protected by a hydrolyzable group. In one aspect, the siloxanyl group serves to increase the oxygen permeability of the molded plastics obtained. Compounds having a siloxanyl group, especially those having no hydrophilic group in the molecule, can have an extremely high water repellency, so that it can be difficult to use the compounds as a material for producing ophthalmic lenses without copolymerization with a hydrophilic monomer. However, a hydrophobic monomer having no hydrophilic group is typically not well copolymerized with a hydrophilic monomer, and the obtained copolymer is typically opaque when the content of the hydrophilic monomer is high. To increase the oxygen permeability, it is typically necessary to increase the content of the siloxanyl group accordingly. However, by so doing, water repellency can be increased, so that more hydrophilic monomer must be copolymerized. Thus, in preparing ophthalmic lenses, the compatibility of the siloxanyl compound with the hydrophilic monomer can be important. Since the material for producing molded plastics, according to the present invention has, in its structure, a hydroxyl group which is hydrophilic or a hydroxyl group protected by a hydrolyzable group, it can be mixed with the hydrophilic monomer at an optional ratio, and is well copolymerized with the hydrophilic monomer. As a result, the obtained copolymer is colorless and transparent, even when it contains water.

In cases where the siloxanyl compound represented by the Formula (A2-1) or (A2-2) has a hydroxyl group protected by a hydrolyzable group, that is, in cases where "X" in the Formula (A2-1) or (A2-2) is a hydrolyzable group, it is preferred to convert X to hydrogen by hydrolysis or solvolysis, thereby making the siloxanyl compound have a hydroxyl group. The conversion of "X" to hydrogen can be carried out after preparing molded plastics, or can be carried out at a stage prior to the polymerization for preparing the molded plastics. The latter is preferred because the compatibility with other hydrophilic polymeric material is promoted.

With the siloxanyl compound represented by the Formula (A1), since the epoxy group is opened to generate a hydroxyl group after polymerization, oxygen permeability and hydrophilicity can be attained simultaneously.

4. Mode

It is understood that a composition comprising compounds comprising a variable number of residues, for example a polymer or an oligomer, can have a distribution of molecular weights resulting from the varying number of residues among individual molecules. That is, the individual molecules of the compound in the composition can have different degrees of polymerization (DP). Such a distribution can have an average number of residues that can be described by the mean, median, or mode.

For example, in the siloxanyl compounds of the invention, a number of residues can be described by "n," wherein n represents an integer of 0 or more. In the compositions of the invention, for example, the individual molecules of the compound can have a mode. For example, the mode can be from about 2 to about 9, from about 3 to about 6, from about 4 to about 8, from about 2 to about 5, from about 3 to about 7, about 2, about 3, about 4, about 5, about 6, about 7, about 8, or about 9.

5. Distribution

The percentage of the siloxanyl compound in which "n" is the mode in the siloxanyl compounds is determined by the above-described GC analysis. In cases where the siloxanyl compounds wherein "n" is not less than 15 are detected by GPC method, LC-MS method or MALDI-TOFMS method, the content of such compounds is also included in the calculation of the above-mentioned percentage of the siloxanyl compound wherein the "n" is the mode. The above-mentioned percentage is not typically less than about 90%, more preferably not less than about 95%, still more preferably not less than about 98%. In one aspect, this percentage is preferably as high as possible because the optical non-uniformity of the molded ophthalmic lens is decreased.

The percentage of the siloxanyl compound in which the "n" is the mode in the siloxanyl compounds is typically not less than about 90%.

6. Content

The content of the compounds is defined as the ratio of the total of the peak areas of the siloxanyl compounds (the total of those wherein "n" is typically not less than 0) based on the total of the peak areas of any compounds detected in the GC analysis. The above-mentioned content must be not less than about 92%, more preferably not less than about 94%, still more preferably not less than about 96%. The content is preferably as high as possible because high ophthalmic reliability of the molded ophthalmic lens can be attained. In cases where the siloxanyl compounds wherein "n" is not less than 15 are detected by GPC method, LC-MS method or MALDI-TOFMS method, the content of such compounds is also included in the calculation of the above-mentioned content of the siloxanyl compounds.

The content of the siloxanyl compounds is typically not less than about 92%.

In a further aspect, the content of the compound in the composition is at least about 92% by weight. For example, at least about 93% by weight, at least about 94% by weight, at least about 95% by weight, at least about 96% by weight, at least about 97% by weight, at least about 98% by weight, or at least about 99% by weight.

7. Purity

In one aspect, the compositions can be provided having a high purity. That is, the compositions can have a relatively low concentration of undesirable impurities. Undesirable impurities can include, for example, epoxide or diol moieties that can have irritating properties when the compositions are used as contact lenses and intraocular lenses.

In certain aspects, an undesirable impurity, for example an epoxide moiety or a diol moiety, is present in a concentration of less than about 100 ppm, less than about 80 ppm, less than about 60 ppm, less than about 40 ppm, less than about 20 ppm, or less than about 10 ppm. In a further aspect, an undesirable impurity, for example an epoxide moiety or a diol moiety, is substantially absent from the composition.

Without wishing to be bound by theory, it is believed that by avoiding an epoxide-functionalized reagent in the final preparation step, the amount or concentration of undesirable epoxide or diol impurities can be minimized or eliminated from the compounds.

C. Polymer Compositions

In one aspect, the invention relates to a composition comprising a polymer comprising residues of:

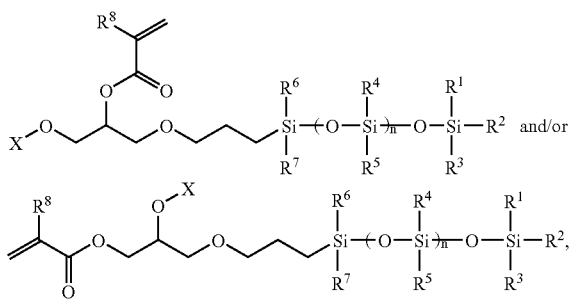

wherein $R^1$ to $R^7$ independently represent hydrogen, $C_1$-$C_{18}$ alkyl, or phenyl; wherein n represents an integer of 0 or more; wherein the mode of the integer is from about 2 to about 9; wherein the molar percentage of the polymer in which n is from 2 to 9 in the total material is at least about 90%; wherein X is hydrogen or a hydrolyzable group; and wherein $R^8$ is hydrogen, methyl, or $C_2$-$C_4$ alkyl.

1. Content

In a further aspect, the content of the polymer in the composition is at least about 92% by weight. For example, at least about 93% by weight, at least about 94% by weight, at least about 95% by weight, at least about 96% by weight, at least about 97% by weight, at least about 98% by weight, or at least about 99% by weight.

2. Purity

In certain aspects, an undesirable impurity, for example an epoxide moiety or a diol moiety, is present in a concentration of less than about 100 ppm, less than about 80 ppm, less than about 60 ppm, less than about 40 ppm, less than about 20 ppm, or less than about 10 ppm. In a further aspect, an undesirable impurity, for example an epoxide moiety or a diol moiety, is substantially absent from the composition.

Again, without wishing to be bound by theory, it is believed that by avoiding an epoxide-functionalized reagent in the final preparation step, the amount or concentration of undesirable epoxide or diol impurities can be minimized or eliminated from the compositions.

3. Copolymers

In one aspect, the polymer compositions of the invention can be provided as copolymers. That is, the siloxanyl compounds of the invention can be copolymerized with at least one comonomer, for example, a hydrophilic comonomer. Suitable hydrophilic comonomers include 2-hydroxyethyl methacrylate.

As the polymerizable materials which may be used for the copolymerization, monomers having a polymerizable carbon-carbon unsaturated bond such as (meth)acryloyl group, styryl group, allyl group, or vinyl group may be employed.

Preferred examples of such monomers include alkyl(meth)acrylates such as (meth)acrylic acid, itaconic acid, crotonic acid, cinnamic acid, vinylbenzoic acid, methyl (meth)acrylate and ethyl(meth)acrylate; polyfunctional (meth)acrylates such as polyalkylene glycol mono(meth)acrylate, polyalkylene glycol monoalkyl ether (meth)acrylate, polyalkylene glycol bis(meth)acrylate, trimethylolpropane tris(meth)acrylate, pentaerythritol tetrakis(meth)acrylate, polydimethyl siloxane having (meth)acryloxypropyl group at both ends, polydimethyl siloxane having (meth)acryloxypropyl group at one end and polydimethyl siloxane having a plurality of (meth)acryloyl groups in side chains; halogenated alkyl (meth)acrylates such as trifluoroethyl(meth)acrylate and hexafluoroisopropyl(meth)acrylate; hydroxyalkyl(meth)acrylates having hydroxyl group such as 2-hydroxyethyl (meth)acrylate, 2-hydroxypropyl(meth)acrylate and 2,3-dihydroxypropyl(meth)acrylate; (meth)acrylamides such as N,N-dimethylacrylamide, N,N-diethylacrylamide, N,N-di-n-propylacrylamide, N,N-diisopropylacrylamide, N,N-di-n-butylacrylamide, N-acryloylmorpholine, N-acryloylpiperidine, N-acryloylpyrrolidine and N-methyl(meth)acrylamide; N-vinyl-N-methyl acetamide, N-vinyl-N-ethyl acetamide, N-vinyl-N-ethyl formamide, N-vinyl formamide, aromatic vinyl monomers such as styrene, α-methylstyrene and vinylpyridine; maleimides; heterocyclic vinyl monomers such as N-vinylpyrrolidone; 3-[tris(trimethylsiloxy)silyl] propyl (meth)acrylate, 3-[bis(trimethylsiloxy)methylsilyl] propyl(meth)acrylate, 3-[(trimethylsiloxy)dimethylsilyl] propyl(meth)acrylate, 3-[tris(trimethylsiloxy)silyl]propyl (meth)acrylamide, 3-[bis(trimethylsiloxy)methylsilyl]propyl(meth)acrylamide, 3-[(trimethylsiloxy)dimethylsilyl]propyl(meth)acrylamide, [tris(trimethylsiloxy)silyl]methyl (meth)acrylate, [bis(trimethylsiloxy)methylsilyl]methyl (meth)acrylate, [(trimethylsiloxy)dimethylsilyl]methyl (meth)acrylate, [tris(trimethylsiloxy)silyl]methyl (meth) acrylamide, [bis(trimethylsiloxy)methylsilyl]methyl(meth) acrylamide, [(trimethylsiloxy)dimethylsilyl]methyl(meth) acrylamide, [tris(trimethylsiloxy)silyl]styrene, [bis (trimethylsiloxy)methylsilyl]styrene, [(trimethylsiloxy) dimethylsilyl]styrene, polydimethyl siloxane having (meth) acryloxypropyl group at one end, and compounds represented by Formula (C1-1) to (C6-1) and (C1-2) to (C6-2) below.

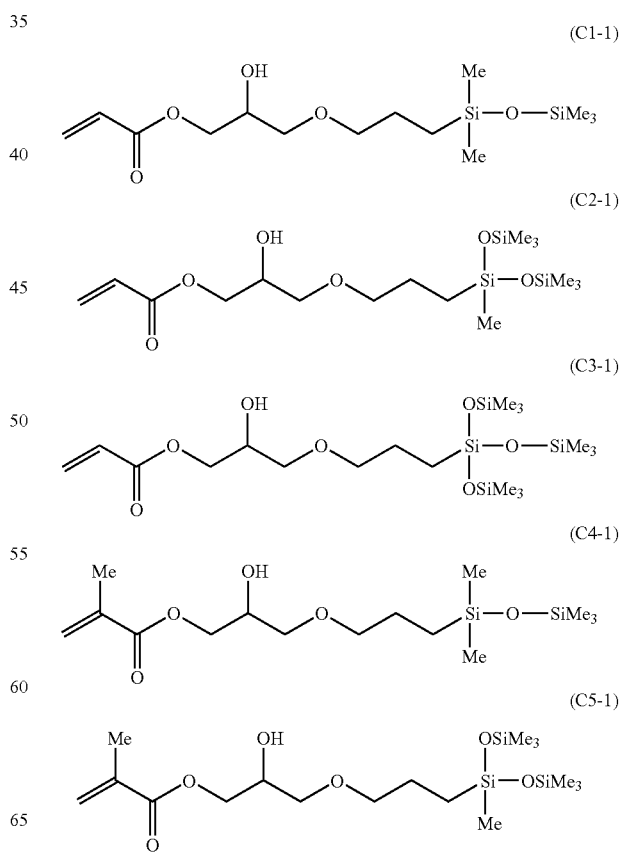

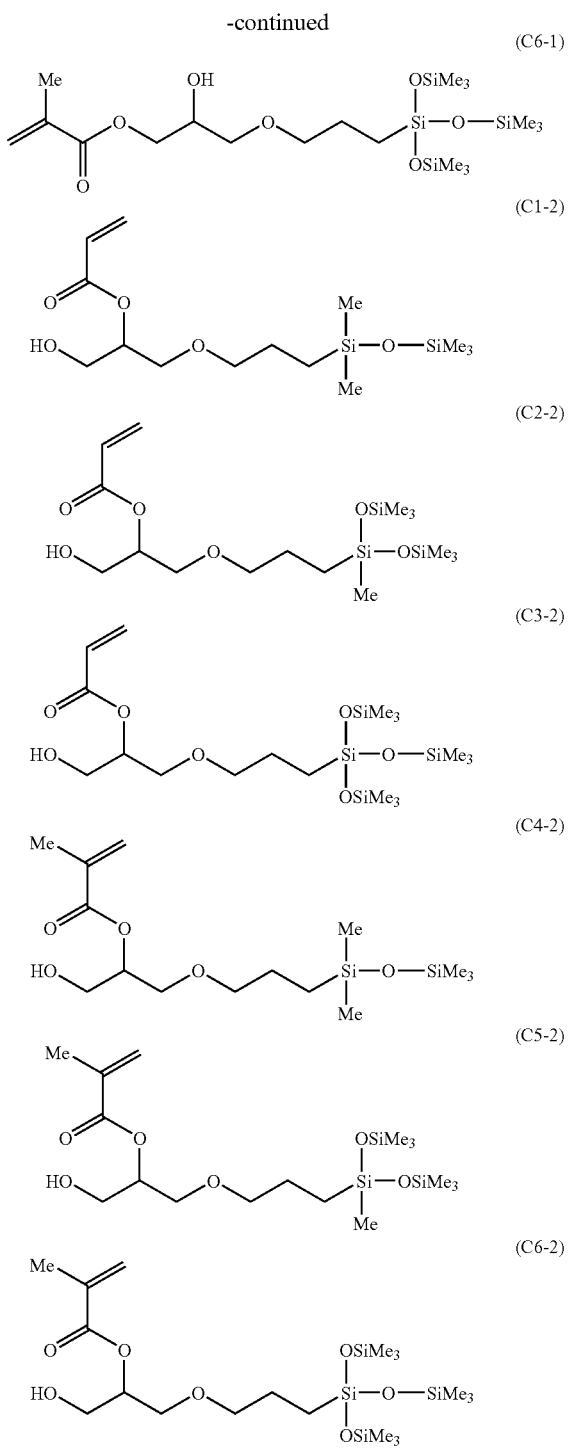

Other silicone containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662; and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups.

Further preferred examples of such monomers include 2-propenoic acid, 2-methyl-2-hydroxy-3-[3-[1,3,3,3-tetramethyl-1-[(trimethylsilyl)oxy]disiloxanyl]propoxy]propyl ester (SiGMA); monomethacryloxypropyl-terminated mono-n-butyl terminated polydimethylsiloxane (mPDMS; MW 800-1000 ($M_n$)); bis-3-acryloxy-2-hydroxypropyloxypropyl polydimethylsiloxane (acPDMS) (MW 1000 and 2000, acrylated polydimethylsiloxane from Gelest and Degussa, respectively); methacryloxypropyl-terminated polydimethylsiloxane (MW 550-700) from Gelest (maP-DMS); and mono-(3-methacryloxy-2-hydroxypropyloxy) propyl terminated, mono-butyl terminated polydimethylsiloxane (mPDMS-OH).

In one embodiment, comonomers include (meth)acrylic acid, 2-hydroxyethyl (meth)acrylate, 2-hydroxypropyl (meth)acrylate, N,N-dimethylacrylamide, N-vinyl pyrrolidone, N-vinyl-N-methyl acetamide, N-vinyl-N-ethyl acetamide, 3-[tris(trimethylsiloxy)silyl]propyl(meth)acrylate, 3-[bis(trimethylsiloxy)methylsilyl]propyl (meth)acrylate, the compounds C1-1, C2-1, C3-1, C4-1, C5-1, C6-1, C1-2, C2-2, C3-2, C4-2, C5-2, C6-2, polysiloxane macromers, hydrophilic siloxyanyl methacrylates containing ether and siloxanyl linkages, and combinations thereof, and the like.

D. Applications of the Compositions

In one aspect, the present invention provides a material from which molded plastics having a satisfactory oxygen permeability, satisfactory hydrophilicity and resistance to breakage can be produced by polymerizing the material. The molded plastics can be useful as drug adsorbents used for drug delivery, and ophthalmic lenses such as contact lenses, intraocular lenses, artificial cornea and spectacle lenses. Among these, they are particularly suited for contact lenses.

In one aspect, the compositions can provide materials for producing molded plastics, which material is excellent in compatibility with hydrophilic monomers such as, but not limited to 2-hydroxyethyl methacrylate, N-vinyl pyrrolidone, N,N-dimethylacrylamide, N-vinyl-N-methyl acetamide combinations thereof and the like which is capable of yielding molded plastics, by polymerizing the material, having a satisfactory oxygen permeability, satisfactory hydrophilicity and a low modulus of elasticity, as well as excellent optical quality.

In one aspect, the compounds and compositions of the invention can be used to provide a molded article comprising at least one of the compositions of the invention. In a further aspect, the compounds and compositions of the invention can be used to provide an ophthalmic lens comprising at least one of the compositions of the invention. In a yet further aspect, the compounds and compositions of the invention can be used to provide a contact lens comprising at least one of the compositions of the invention.

E. Methods of Making the Compounds

Typically, the siloxanyl compounds of the invention can be prepared by any method known to those of skill in the art of synthetic organic chemistry. One suitable method of preparation is hydrosilylation of an epoxide-functionalized compound, followed by reaction with an alkylacrylic acid to provide an acryloyl-functionalized polydimethylsiloxane. A further suitable method of preparation is hydrosilylation of an acryloyl-functionalized compound prepared by reaction with an alkylacrylic acid.

1. Hydrosilylation of Epoxide-Functionalized Compounds

In one aspect, the invention relates to a method of synthesizing a siloxanyl compound, comprising the steps of treating a first compound having the structure:

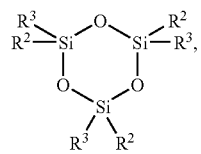

wherein $R^2$ and $R^3$ independently represent hydrogen, $C_1$-$C_{18}$ alkyl, or phenyl, with $R^1Li$ to yield a second compound having the structure:

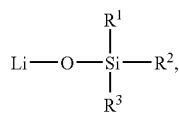

wherein $R^1$ represents hydrogen, $C_1$-$C_{18}$ alkyl, or phenyl; optionally treating one or more times the product of the previous step with a third compound having the structure:

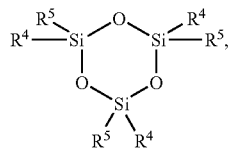

to yield a fourth compound having the structure:

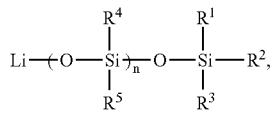

wherein n represents an integer of 0 or more; reacting the product of the previous step with a fifth compound having the structure:

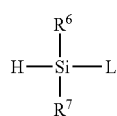

to yield a sixth compound having the structure:

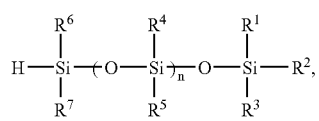

wherein L represents Cl, Br, I, hydroxyl, alkoxyl, acyloxyl, or other leaving group; hydrosilylating allyl glycidyl ether with the product of the previous step to yield a compound having the structure:

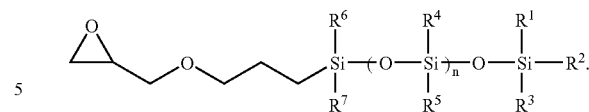

In a further aspect, the method can further comprise the step of treating the product of the previous step with an alkylacrylic acid to yield a compound having the structure:

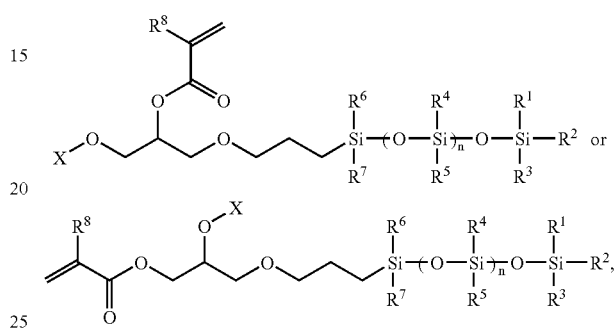

wherein X is hydrogen or a hydrolyzable group, and wherein $R^8$ is hydrogen, $C_1$-$C_{18}$ alkyl, or phenyl. In certain aspects, $R^8$ is hydrogen or methyl.

2. Hydrosilylation of Acryloyl-Functionalized Compounds

In one aspect, the invention relates to methods of synthesizing an acryloyl compound, comprising the step of hydrosilylating a first compound having the structure:

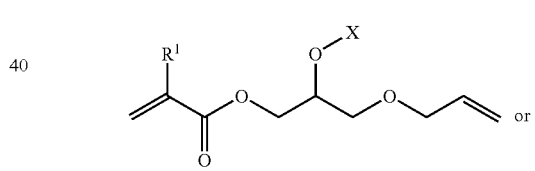

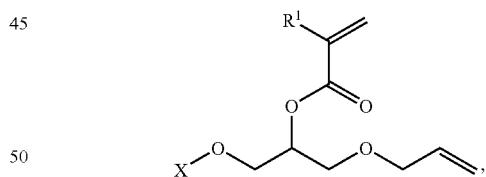

wherein $R^1$ represents hydrogen, $C_1$-$C_{18}$ alkyl, or phenyl, and wherein X represent hydrogen or a hydrolysable group; with a second compound having the structure A-H, wherein A comprises a siloxanyl group, to yield a third compound having the structure:

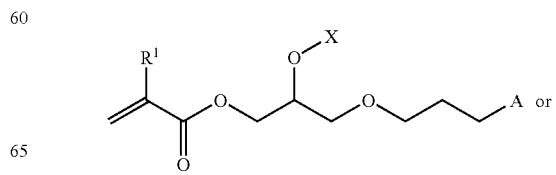

-continued

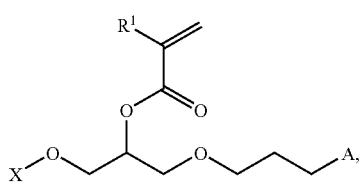

wherein X is hydrogen or a hydrolysable group; and wherein A is a siloxanyl group.

In this aspect, a method employing an epoxide-functionalized reagent in the final preparation step is avoided, thereby minimizing or eliminating the amount or concentration of undesirable epoxide or diol impurities in the compositions. In one aspect, the hydrosilylation step is performed in the presence of a polymerization inhibitor or a radical scavenger.

In a further aspect, the siloxanyl group comprises the structure;

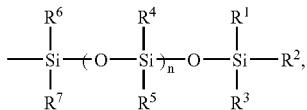

wherein $R^1$ to $R^7$ independently represent hydrogen, $C_1$-$C_{18}$ alkyl, or phenyl; wherein n represents an integer of 0 or more; wherein the mode of the integer is from about 2 to about 9; wherein the molar percentage of the compound in which n is from 2 to 9 in the total material is at least about 90%.

In a further aspect, X is a hydrolysable group, and the method further comprises the step of hydrolyzing or solvolyzing the third compound to yield a fourth compound having the structure:

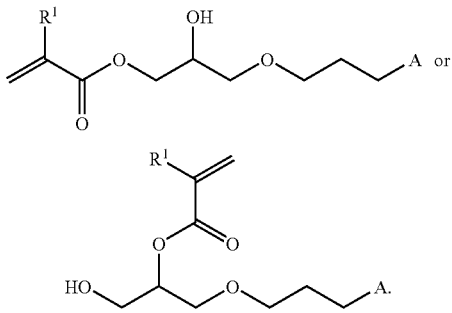

In a further aspect, the method further comprises the step of providing the first compound by treating allyl glycidyl ether with an alkylacrylic acid to yield a starting compound having the structure:

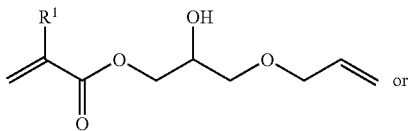

-continued

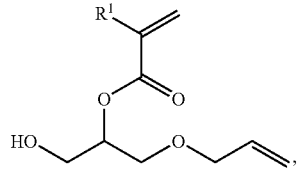

optionally in the presence of a polymerization inhibitor or a radical scavenger, wherein $R^1$ represents hydrogen, $C_1$-$C_{18}$ alkyl, or phenyl; and optionally protecting the hydroxyl group with a protecting reagent to yield a second compound having the structure:

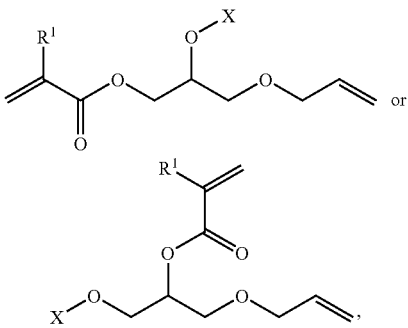

wherein X is a hydrolysable group.

In a yet further aspect, $R^1$ is hydrogen or methyl.

In a still further aspect, the protecting reagent is an alkylating agent, an acylating agent, or a silylating agent.

F. Preparation of Molded Plastics

The molded plastics can be prepared by polymerizing the siloxyanyl compounds of the present invention alone or with one or more other of the comonomers or materials described herein.

For example, when the siloxanyl compound represented by the Formula (A1) is used, the molded plastics can be obtained by the polymerization of the epoxy group alone. Alternatively, molded plastics can be obtained by copolymerizing the compound of the Formula (A1) with one or more compounds selected from the group consisting of a compound having two or more amino groups in the molecule, a compound having two or more hydroxyl groups, a compound having two or more mercapto groups and a compound having two or more carboxyl groups in the molecule.

When the siloxanyl compound represented by the Formula (A2-1) and/or the siloxanyl compound represented by the Formula (A2-2) is used, the molded plastics can be obtained by the polymerization of the (meth)acryloyl group alone. Alternatively, molded plastics can be obtained by copolymerizing the compound(s) of the Formula (A2-1) and/or Formula (A2-2) with one or more other comonomers and/or materials as described herein.

For preparing the molded plastics, especially ophthalmic lenses, additional materials can also be included in the polymerization mixture. For example, a crosslinker having two or more polymerizable carbon-carbon unsaturated bonds in the molecule can be included to obtain good mechanical properties and good resistance to antiseptic solutions and washing solutions. The percentage of the crosslinker, based on the total monomers to be copolymerized, is preferably not less than about 0.01% by weight, more between about 0.05% and about 15% by weight, still more preferably between about 0.1% and about 5% by weight.

From the viewpoint of simultaneously attaining a satisfactory oxygen permeability and satisfactory hydrophilicity, the percentage of the material for producing molded plastics according to the present invention in the prepared molded plastics is, in cases where other siloxanyl-group containing polymerizable material is not copolymerized, preferably from about 30% by weight to about 100% by weight, more preferably from about 50% by weight to about 99% by weight, still more preferably from about 60% by weight to about 95% by weight. In cases where one or more other siloxanyl group-containing polymerizable materials are copolymerized, the percentage of the total of the material according to the present invention and the other siloxanyl group-containing polymerizable material(s) in the prepared molded plastics is preferably from about 30% by weight to about 100% by weight, more preferably from about 50% by weight to about 99% by weight, still more preferably from about 60% by weight to about 95% by weight.

The molded plastics may contain additional components, including, but not limited to UV absorbers, colorants, coloring agents, wetting agents, slip agents, pharmaceutical and nutraceutical components, compatibilizing components, antimicrobial compounds, release agents, combinations thereof and the like. Any of the foregoing may be incorporated in non-reactive, polymerizable, and/or copolymerized form.

In the (co)polymerization for preparing the molded plastics, it is preferred to add a thermal polymerization initiator or photopolymerization initiator typified by peroxides and azo compounds for easily attaining polymerization. In cases where thermal polymerization is carried out, one having the optimum decomposition characteristics at the satisfactory reaction temperature is selected. In general, azo initiators and peroxide initiators having a 10 hour half-life temperature of from about 40° C. to about 120° C. are preferred. Examples of the photoinitiator include carbonyl compounds, peroxides, azo compounds, sulfur compounds, halogenated compounds and metal salts. These polymerization initiators can be used individually or in combination. The amount of the polymerization initiator(s) can be up to about 1% by weight based on the polymerization mixture.

In (co)polymerizing the material for producing molded plastics according to the present invention, a polymerization solvent can be used. As the solvent, various organic and inorganic solvents can be employed. Examples of the solvents include water; alcoholic solvents such as methyl alcohol, ethyl alcohol, normal propyl alcohol, isopropyl alcohol, normal butyl alcohol, isobutyl alcohol, tert-butyl alcohol, ethylene glycol, diethylene glycol, triethylene glycol, tetraethylene glycol and polyethylene glycol; glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether and polyethylene glycol dimethyl ether; ester solvents such as ethyl acetate, butyl acetate, amyl acetate, ethyl lactate and methyl benzoate; aliphatic hydrocarbon solvents such as normal hexane, normal heptane and normal octane; alicyclic hydrocarbon solvents such as cyclohexane and ethylcyclohexane; ketone solvents such as acetone, methyl ethyl ketone and methyl isobutyl ketone; aromatic hydrocarbon solvents such as benzene, toluene and xylene; and petroleum solvents. These solvents can be used individually or two or more of these solvents can be used in combination.

As the method of polymerization of the material for producing molded plastics according to the present invention, and as the method of molding the plastics, known methods can be employed. For example, a method in which the material is once polymerized and molded into the shape of round bar or plate and the resulting round bar or plate is then processed into the satisfactory shape by cutting or the like, mold polymerization method and spin cast polymerization method can be employed.

As an example, a process for producing an ophthalmic lens by polymerizing the material composition containing the material for producing molded plastics according to the present invention by mold polymerization method will now be described.

First, a gap having a prescribed shape, between two mold parts is filled with the material composition and photopolymerization or thermal polymerization is carried out to shape the composition into the shape of the gap between the molds. The molds are made of a resin, glass, ceramics, metal, or the like. In case of photopolymerization, an optically transparent material is used, and a resin or glass is usually used. In case of producing an ophthalmic lens, a gap is formed between two mold parts facing each other, and the gap is filled with the material composition. Depending on the shape of the gap and on the properties of the material composition, a gasket may be used in order to give the ophthalmic lens a prescribed thickness and to prevent leakage of the material composition filled in the gap. The molds containing the gap filled with the material composition are then irradiated with an actinic radiation such as ultraviolet light, visible light or a combination thereof, or placed in an oven or bath to heat the material composition, thereby carrying out polymerization. The two polymerization methods may be employed in combination, that is, thermal polymerization may be carried out after photopolymerization, or photopolymerization may be carried out after thermal polymerization. In photopolymerization embodiment, a light containing ultraviolet light, such as the light from a mercury lamp or UV lamp (e.g., FL15BL, TOSHIBA corporation) is radiated for a short time (usually not longer than 1 hour). In cases where thermal polymerization is carried out, it is preferred to employ conditions in which the composition is slowly heated from room temperature to a temperature from about 60° C. to about 200° C. over a period of several hours to several tens hours, in view of the optical uniformity, high quality, and high reproducibility of the ophthalmic lens.

The molded plastics produced from the material of the present invention may preferably have a dynamic contact angle (during forward movement, immersion rate: about 0.1 mm/sec) of not more than about 130°, more preferably not more than about 120°, still more preferably not more than about 100°. The water content thereof is preferably from about 3% to about 50%, more preferably from about 5% to about 50%, still more preferably from about 7% to about 50%. From the viewpoint of the wearer when the ophthalmic lens is used as a contact lens, the higher the oxygen permeability, the better. The oxygen permeability coefficient $[\times 10^{-11} (cm^2/sec)mLO_2/(mL \cdot hPa)]$ is preferably not less than about 50, more preferably not less than about 60, still more preferably not less than about 65. The tensile modulus of elasticity is preferably from about 0.01 to about 30 MPa, more preferably from about 0.1 to about 7 MPa. The tensile elongation is preferably not less than about 50%, more preferably not less than about 100%. Since a higher tensile elongation gives higher resistance to breakage, it is preferred that the molded plastics have a high tensile elongation. These properties may be measured using the test methods disclosed in WO03/022321.

The molded plastics are useful as drug carriers used for drug delivery, and ophthalmic lenses such as contact lenses, intraocular lenses, artificial cornea, and spectacle lenses. Among these, they are particularly suited for ophthalmic lenses such as contact lenses, intraocular lenses, and artificial cornea. Among these, they are particularly suited for ophthalmic lenses, especially contact lenses.

G. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Synthesis of Compound A1

First, a compound represented by the Formula (D1) below is synthesized.

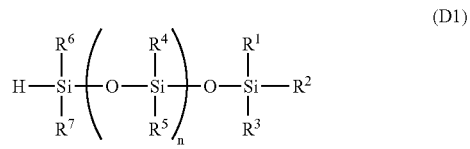
(D1)

To synthesize the compound of the Formula (D1), a compound represented by the Formula $R^1Li$ and a compound represented by the Formula (E1) below are reacted in an aprotic solvent (Step 1).

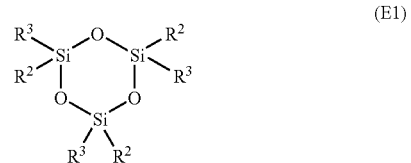
(E1)

In this reaction, the molar ratio of the compound represented by the Formula $R^1Li$ to the compound of the Formula (E1) is preferably 0.1:1 to 5:1, more preferably 0.2:1 to 3.5:1. The reaction temperature is preferably −50° C. to 50° C., more preferably −20° C. to 40° C., still more preferably −10° C. to 30° C. The reaction solvent is an aprotic solvent, and preferred examples thereof include aliphatic hydrocarbon solvents such as hexane, heptane, and petroleum benzine; aromatic hydrocarbon solvents such as toluene and xylene; and ether solvents such as tetrahydrofuran, diethyl ether, and ethylene glycol dimethylether. Two or more of these solvents can be used in combination. The reaction time is preferably from about 10 minutes to about 10 hours, more preferably from about 30 minutes to about 6 hours.

Then a compound represented by the following Formula (E2) is added to the reaction system, and the resulting mixture is allowed to further react (Step 2). However, Step 2 can be omitted. In cases where Step 2 is omitted, in the above-described Formula (D1), $R^4$ represents the same substituent group as $R^2$, and $R^5$ represents the same substituent group as $R^3$.

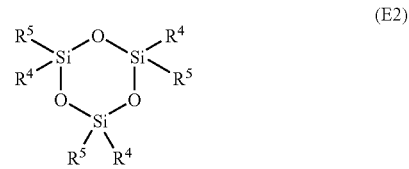
(E2)

In Step 2, the molar ratio of the compound represented by Formula $R^1Li$ used in Step 1 to the compound represented by Formula (E2) is preferably 0.1:1 to 5:1, more preferably 0.2:1 to 3.5:1. The compound represented by Formula (E2) can be added in the form of a solution dissolved in an aprotic solvent. Preferred examples of the solvent used therefor are the same as those of the reaction solvent used in Step 1. The reaction temperature is preferably from about −50° C. to about 50° C., more preferably from about −20° C. to about 40° C., still more preferably from about −10° C. to about 30° C. The reaction time is preferably from about 10 minutes to about 10 hours, more preferably from about 30 minutes to about 6 hours.

Thereafter, a compound represented by the following Formula (E3) is added to the reaction system, and the resulting mixture is allowed to further react (Step 3).

(E3)

In Step 3, the molar ratio of the compound represented by the Formula $R^1Li$ used in Step 1 to the compound represented by the Formula (E3) is preferably from about 0.2:1 to about 5:1, more preferably from about 0.5:1 to about 2:1. The compound of the Formula (E3) can be added in the form of a solution dissolved in an aprotic solvent. Preferred examples of the solvent used therefor are the same as the reaction solvent used in Step 1. The reaction temperature is preferably from about −50° C. to about 50° C., more preferably from about −10° C. to about 40° C., still more preferably from about 0° C. to about 30° C. The reaction time is preferably from about 10 minutes to about 10 hours, more preferably from about 30 minutes to about 6 hours.

By the above-described operations, a crude compound represented by Formula (D1) is obtained. This compound is then purified by a purification method such as distillation method or column chromatography method. As the purification method, distillation method is most preferred.

The symbols in the above-described Formulae (D1), (E1), (E2), and (E3) represent the same meanings as the corresponding symbols in the above-described Formulae (A1), (A2-1), and (A2-2).

Thereafter, allylglycidyl ether and the compound of the above-described Formula (D1) are reacted to synthesize the compound represented by the Formula (A1) (Step 4).

In Step 4, the molar ratio of allylglycidyl ether and the compound of the Formula (D1) is preferably from about 0.5:1 to about 2:1, more preferably from about 0.8:1 to about 1.2:1. In Step 4, a noble metal-based hydrosilylation catalyst is typically used. The noble metal-based hydrosilylation catalyst can be a known catalyst which is usually used in hydrosilylation reactions. Examples of the catalyst include particulate platinum, particulate platinum carried by carbon powder carrier or inorganic oxide powder carrier, chloroplatinic acid, alcohol-modified chloroplatinic acid, olefin complex of chloroplatinic acid, coordination compound between chloroplatinic acid and vinyl siloxane, platinum black, tetrakis(triphenylphosphine)palladium, palladium black and rhodium catalyst. In case of a homogenous catalyst, the amount of the catalyst is preferably from about 0.1 ppm to about 100 ppm based on the total weight of the allylglycidiyl ether and the compound of the Formula (D1), and in case of a heterogeneous catalyst, the amount of the catalyst is preferably from about 20 ppm to about 2000 ppm based on the total weight of the allylglycidiyl ether and the compound of the Formula (D1). The reaction can be carried out in a solvent or can be carried out without a solvent. Industrially, it is most preferred to carry out the reaction without a solvent. Preferred examples of the solvent are the same as those of the reaction solvent used in Step 1. The reaction temperature is preferably from about −10° C. to about 150° C., more preferably from about 20° C. to about 120° C. The reaction time is preferably from about 10 minutes to about 10 hours, more preferably from about 30 minutes to about 6 hours.

By the above-described operations, the compound represented by the Formula (A1) is obtained. When a heterogeneous hydrosilylation catalyst is used, the catalyst can be removed by filtration at this stage. The product can be purified as required by a purification method such as distillation method or column chromatography method.

2. Synthesis of Compounds A2-1 and A2-2

(Meth)acrylic acid and the compound represented by the Formula (A1) are reacted to synthesize the compound represented by the Formula (A2-1) or (A2-2) ("X" in the formula is hydrogen) (Step 5).

In Step 5, it is preferred to add a polymerization inhibitor or a radical scavenger in order to prevent gelation or solidification of the reaction medium during the synthesis reaction.

Preferred examples of the polymerization inhibitor include phenolic compounds such as hydroquinone, hydroquinone monomethyl ether, 2,6-di-t-butyl-4-methylphenol and 4-t-butylcatechol; and aluminum N-nitrosophenylhydroxylamine. The amount of the polymerization inhibitor is preferably from about 0.0005 to about 30 mol %, more preferably from about 0.001 to about 25 mol %, still more preferably from about 0.005 to about 20 mol %, based on the amount of the (meth)acrylic acid.

Preferred examples of the radical scavenger include iodine, oxygen, nitrogen monoxide, hydrogen iodide, iron(III) chloride, anthracene and α,α'-diphenylpicrylhydrazyl. One or more polymerization inhibitors and one or more radical scavengers may also preferably be used in combination.

In cases where the radical scavenger is in the form of solid or liquid, the amount of the radical scavenger used in Step 5 is preferably from about 5 ppm to about 50,000 ppm, more preferably from about 50 ppm to about 40,000 ppm, still more preferably from about 100 ppm to about 30,000 ppm, based on the compound of the Formula (A1). In cases where the radical scavenger is in the form of gas, it is preferred to bubble the reaction solution with a gas containing from about 0.1% to about 100% of the scavenger, or to carry out the synthesis reaction under the atmosphere of the gas. In cases where oxygen is used as the scavenger gas, the oxygen concentration is preferably from about 0.1 to about 100%, and in view of the balance between the explosion proof characteristics and the effect as a scavenger, it is more preferably from about 0.1 to about 80%, still more preferably from about 0.1 to about 60%. Since the air contains oxygen, the reaction can be carried out under bubbling with air or under air atmosphere.

The amount of (meth)acrylic acid used in Step 5 is preferably from about 1 to about 20 equivalents, more preferably from about 2 to about 12 equivalents, still more preferably from about 4 to about 10 equivalents with respect to the compound of the Formula (A1). In Step 5, to accelerate the reaction, a catalyst can be added. Examples of the catalyst to be used include alkali (earth) metal hydroxides such as lithium hydroxide, sodium hydroxide, potassium hydroxide and calcium hydroxide; amines such as trimethylamine, triethylamine and pyridine; inorganic salts such as calcium carbonate and sodium hydrogen carbonate; alkali (earth) metal methacrylates such as lithium (meth)acrylate, sodium (meth)acrylate, potassium (meth)acrylate and calcium (meth)acrylate. The amount of the catalyst to be added is preferably from about 0.01 to about 50 mol %, more preferably from about 0.05 to about 40 mol %, still more preferably from about 0.1 to about 30 mol % based on the compound of the Formula (A1).

The reaction temperature in Step 5 is preferably from about 50° C. to about 180° C., more preferably from about 60° C. to about 170° C., still more preferably from about 70° C. to about 160° C.

In cases where the radical scavenger used in Step 5 is in the form of solid or liquid, it is preferred to remove the radical scavenger by an appropriate method after the reaction because it may influence on the polymerization of the produced siloxanyl monomer.

The compound represented by the Formula (A2-1) or (A2-2) obtained in Step 5 may preferably be purified by column chromatography. The column chromatography may preferably be carried out using porous particles. In the present specification, the term "porous particle" means a particle having a number of pores in its surface. Specific examples of the porous particles include silica gel, active carbon, alumina, zeolite, and molecular sieve.

In the purification, the weight ratio of the compound of the Formula (A2-1) or (A2-2)/porous particles is preferably from about 1:100 to about 1:0.1, more preferably from about 1:20 to about 1:0.5, still more preferably from about 1:5 to about 1:1, in view of the balance of economy and adsorption capacity. In the purification, a solvent can be used. Examples of the solvent include various alcohols such as methanol, ethanol, propanol, 2-propanol, butanol, ethylene glycol, diethylene glycol, triethylene glycol, tetraethylene glycol, polyethylene glycol, and glycerin; various aromatic hydrocarbons such as benzene, toluene and xylene; various aliphatic hydrocarbons such as hexane, heptane, octane, decane, petroleum ether, kerosene, ligroin, and paraffin; various ketones such as acetone, methyl ethyl ketone, and methyl isobutyl ketone; various esters such as ethyl acetate, butyl acetate, methyl benzoate and dioctyl phthalate; various ethers such as diethyl ether, tetrahydrofuran, dioxane, ethylene glycol dialkyl ether, diethylene glycol dialkyl ether, triethylene glycol dialkyl ether, tetraethylene glycol dialkyl ether and polyethylene glycol dialkyl ether; various aprotic polar solvents such as dimethylformamide, dimethylacetamide, N-methyl-2-pyrrolidone, dimethylimidazolidinone, hexamethylphosphoric triamide and dimethyl sulfoxide; halogen-containing solvents such as methylene chloride, chloroform, dichloroethane, trichloroethane and trichloroethylene; and fluorocarbon solvents. One type of the porous particles can be employed or two or more types of porous particles can be employed in combination.

The compound of the Formula (A2-1) or (A2-2) obtained in Step 5 ("X" in the formula is hydrogen) can be converted to one having a hydrolyzable group as "X", as required, by reacting the compound with an appropriate reagent.

Preferred examples of the reagent which can be used in Step 6 include alkylating agents such as dihydropyran, alkyl halides, tosyloxyalkanes, diazoalkanes and dialkyl sulfates; acylating agents such as various acid anhydrides and various acid halides; and silylation agents such as halogenated silane and silazane. The reaction solvent and the reaction conditions may appropriately be selected depending on the reagent used.

The mode of "n" in Formula (A1) of the siloxanyl compound represented by the Formula (A1) according to the present invention can be determined by gas chromatography (GC) analysis. The method therefor will now be described.

First, the amount of the siloxanyl compounds represented by the Formula (A1) in which "n" is not less than 15 is determined by gel permeation chromatography (GPC), mass spectrometry (LC-MS), or matrix-assisted laser desorption/ionization time-of-flight mass spectrometry (MALDI-TOFMS) or combination thereof. In view of compatibility with hydrophilic monomers, it is preferred that the siloxanyl compounds in which "n" is not less than 15 be substantially absent from the composition. Even if they exist, the mode of "n" determined by the GC analysis described below is typically not less than 2 and typically not more than 9.

Thereafter, by GC analysis, the existence ratio of each of the siloxanyl compounds represented by the Formula (A1) wherein "n" is not less than 0 and not more than 18 is determined from the percentage of the peak area of each compound based on the total of the peak areas. The "n" of the compound whose existence ratio is the largest is defined as the mode.

3. Chromatographic Analysis

In the gas chromatographic (GC) analysis, the identification of the peaks of the siloxanyl compounds represented by the Formula (A1) (wherein n is 0 to 12) is carried out by a separate gas chromatography mass spectrometry (GC-MS).

a. Apparatus and Parameters

Apparatus: Model GC6890 manufactured by HEWLETT-PACKARD or equivalent thereof. Detector: hydrogen flame ionization detector (FID). Column: Restek DB-1HT (30 m×0.25 mm×0.1 μm or equivalent). Carrier Gas: helium. Constant Flow: 1.0 mL/min. Amount of Applied Sample: 2.0 μL. Split Ratio: 30:1. Inlet Temperature: 300° C. Detector Temperature: 350° C. Solvent for Washing Autosampler: 2-propanol. Inlet Septum: Alltech 7/16" HT-X-11 or equivalent thereof.

b. Temperature Program

Initial Temperature: 100° C. Initial time: 2 min. Ramp: 15° C./min; Final Temp: 200° C.; hold for 0 min. Ramp: 5° C./min; Final Temp: 350° C.; hold for 0 min. Ramp: 15° C./min; Final Temp: 400° C.; hold for 15 min.

c. Data Analysis Conditions

Slope Sensitivity: 50. Peak Width: 0.04. Area Reject: 1. Height Reject: 1. Integration Off: from 0 to 4 min.

d. Preparation of Sample

About 50 μL of a sample is dissolved in 1.0 mL of 2-propanol. The sample and 2-propanol are directly placed in a vial for GC and mixed therein.

4. EXAMPLES

In the following Examples, the various measurements were carried out by the following methods:

GC analysis was carried out under the conditions described above in the section Chromatographic analysis.

GC-MS analysis was carried out by carrying out the GC analysis under the conditions described above in the section <GC Analysis Conditions>, and by using as a mass spectrometer JMS-DX303 manufactured by JEOL.

GPC was performed under the following conditions: Column: Shodex GPC K-801 and Shodex GPC K-802 manufactured by SHOKO CO., LTD. (each of them has an inner diameter of 8.0 mm and a length of 30 cm). The two columns were connected in series. Solvent: chloroform. Column Temperature: 40° C. Flow Rate: 1.0 mL/min. Apparatus: HLC-8022GPC manufactured by TOSOH CORPORATION, which is an integral apparatus combining a UV detector and a differential refractometer.

MALDI-TOFMS:AXIMA-CFR plus manufactured by SHIMADZU CORPORATION was used.

Figure 2:
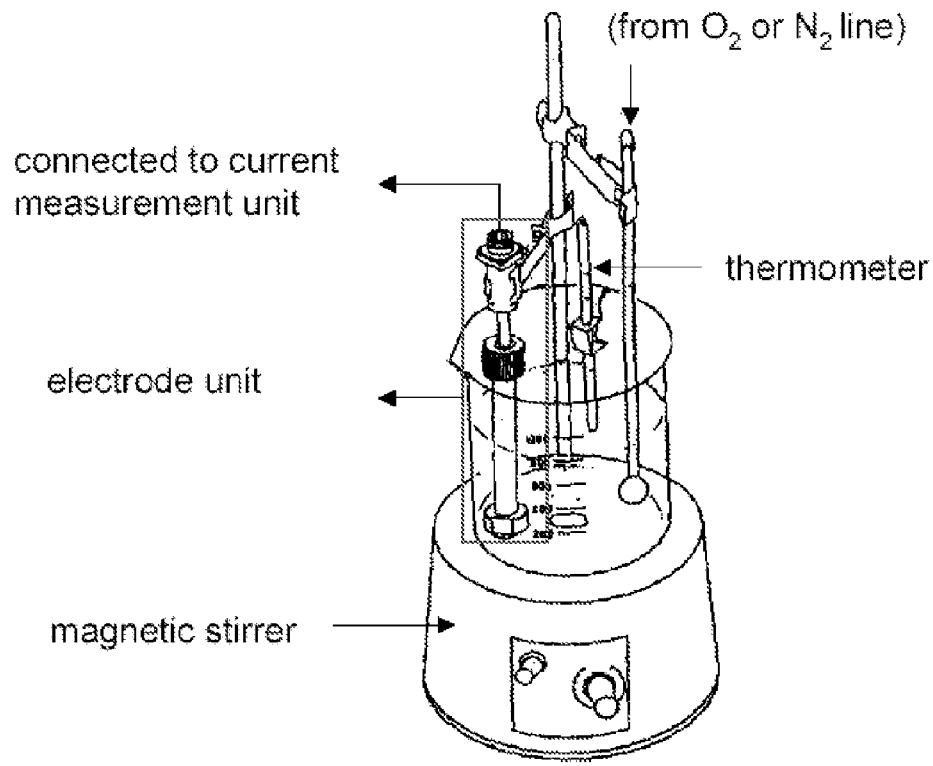
FIG. 2 shows an apparatus for oxygen permeability measurement.
Figure 3:
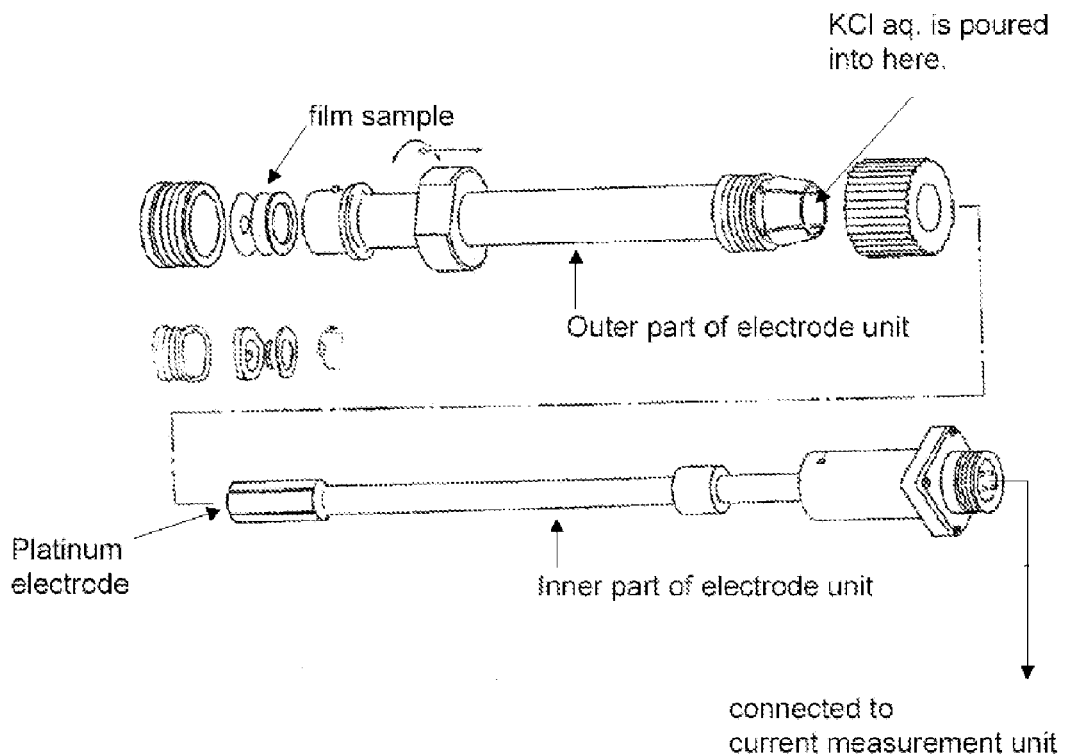
FIG. 3 shows the structure of an electrode unit used to measure oxygen permeability.
Figure 4:
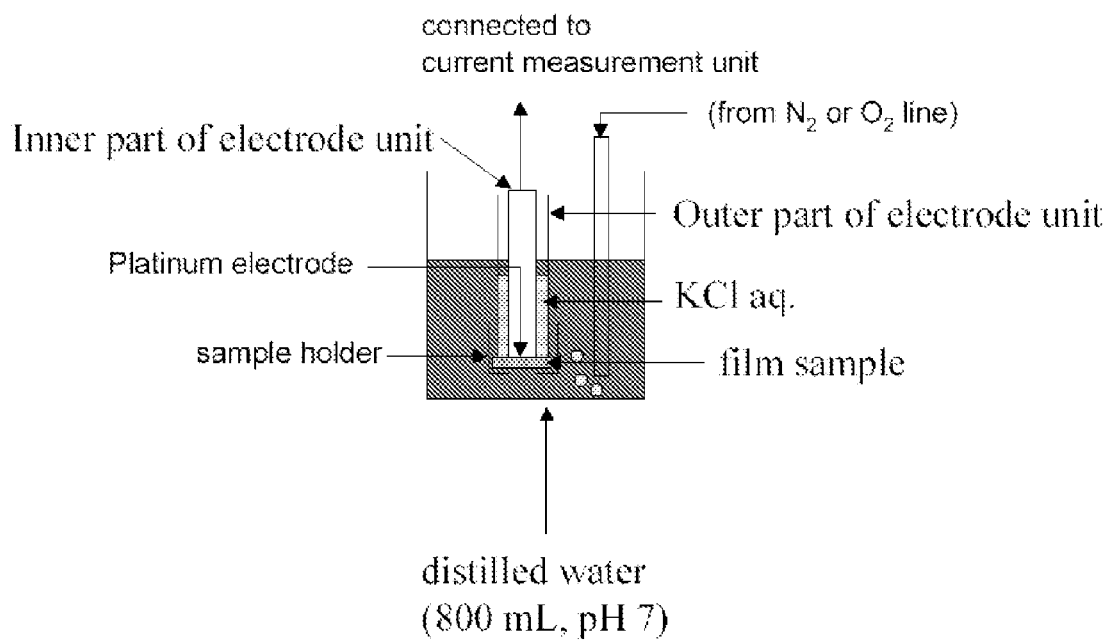
FIG. 4 shows a schematic of an oxygen permeability measurement setup.

A sample's oxygen permeability coefficient was determined by using a Seikaken-shiki film oxygen permeability meter manufactured by RIKA SEIKI KOGYO CO., LTD. The oxygen permeability coefficient of a sample in the form of a film was measured in water at 35° C. (temperature controller not shown in Figure). Stirring was performed at a rate of 800 rpm with a 3 mm octagon-type MAGMIX magnetic stirrer (Mitamura Riken Kogyo Inc.). Four film samples with different thickness were prepared (0.1 mm, 0.2 mm, 0.3 mm, and 0.4 mm; diameter 16 mm). The four samples with different thickness were measured to determine Pm of every example (see FIG. 1); the graduation of the dial upright gauge used was 0.001 mm; with an accuracy of about +/−0.003 mm. One of the samples was set on an electrode. 0.5 N KCl (aqueous) was poured into the electrode as an electrolytic solution (see FIGS. 2-4). The electrode was set in distilled water (pH=7, volume=800 ml). At first, the current under nitrogen bubbling (flow rate=100 mL/min.; electric current, i, is measured after it is in equilibrium) was measured in order to adjust zero. Then the current under oxygen bubbling was measured. R was calculated by the following formula: $R=(Ps \times N \times F \times A)/i$ [$cm^2$ sec mmHg/mL (STP)] (wherein Ps=760 mmHg (atmospheric pressure), N=4 (the number of electrons which involves a reaction at the electrode), F=96500 coulomb/mol (Faraday constant), A=area of the electrode ($cm^2$), i=measured current (uA)). R involves constant (not proportional) part, so plural measurement and plotting are necessary to determine Pm (see FIG. 1). R versus the thickness of the samples was plotted. The inverse of the slope is the oxygen permeability coefficient (Pm).

In oxygen permeability testing, edge correction is typically considered when the area of a material through which oxygen passes differs from one surface of the sample to the other surface. In the present measurement method, the area of the hole of the ring which is set next to a film sample (see FIG. 3, upper left portion) is the same as the area of platinum electrode, so edge correction is unnecessary.

Moisture Content: a sample in the form of a film sizing about 10 mm×10 mm×0.2 mm was used. The sample was dried in a vacuum dryer at 40° C. for 16 hours, and the weight (Wd) of the sample was measured. Thereafter, the resulting sample was immersed in pure water at 40° C. in a thermostat bath overnight or more, and the moisture on the surface was wiped with Kimwipe, followed by measurement of the weight (Ww). The moisture content was calculated according to the following equation:

Moisture Content (%)=100×(Ww−Wd)/Ww

Tensile Test: a sample in the form of a film sizing about 19.5 mm×15 mm×0.2 mm was used. The tensile modulus of elasticity was measured using Tensilon type RTM-100 manufactured by ORIENTEC. The speed of pulling was 100 mm/min and the distance between grips was 5 mm.

Optical Non-uniformity of Molded Plastics: a sample molded into the form of contact lens was irradiated with light with a projector for photograph films to project its image on a screen, and the projected image on the screen was visually observed to evaluate the degree of optical non-uniformity. The evaluation was performed by classification into the following three ranks:

A: Distortion or turbidity is not observed at all.
B: Distortion or turbidity is observed very slightly.
C: Distortion or turbidity is observed.

a. Example 1

To a 1 L three-necked round bottom flask, a 200 mL dropping funnel and a three way stopcock were connected, and the three way stopcock was connected to a vacuum pump and to a nitrogen line. The resulting apparatus was heated with a heat gun while reducing the pressure in the apparatus with the vacuum pump, and then nitrogen was blown thereinto to restore the pressure to the normal pressure. This operation was repeated three times to remove the moisture in the apparatus. To the flask, hexamethylcyclotrisiloxane (22.25 g, 0.1 mol) and toluene (25.7 mL) were added, and the resulting mixture was stirred with a magnetic stirrer. After the hexamethylcyclotrisiloxane was completely dissolved, the flask was immersed in a water bath (room temperature), and 169 mL (0.27 mol) of 1.6 mol/L butyl lithium solution in hexane was added dropwise to the mixture for 34 minutes, followed by stirring the resulting mixture for 1 hour at room temperature. The flask was cooled in an NaCl-containing ice bath, and a solution prepared by dissolving hexamethylcyclotrisiloxane (66.75 g, 0.3 mol) in anhydrous tetrahydrofuran (165 mL) was added dropwise for 60 minutes. The resulting mixture was stirred for 150 minutes under the cooled condition and then stirred at room temperature for 45 minutes. Dimethylchlrosilane (39 mL) was dissolved in tetrahydrofuran (100 mL) and the solution was added dropwise to the mixture for 45 minutes, followed by stirring the resulting mixture for 1 hour. The solution was washed with about 400 mL of water 4 times (with totally about 1.6 L of water), and the organic layer was dried over anhydrous sodium sulfate. After removing the solids by filtration through a pleated filter, the filtrate was recovered in an eggplant type flask, and the solvent was evaporated. The resultant was purified with a semi-micro rectification apparatus (SOGO LABORATORY GLASS WORKS CO., LTD., catalogue No. 2004) to obtain the compound represented by Formula (d1-1). GC analysis revealed that the content of the compound was 99%.

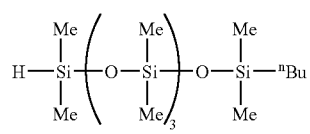

(d1-1)

To a 200 mL three-necked round bottom flask to which a Dimroth condenser and a dropping funnel were connected, allylglycidyl ether (8.47 g, 74.21 mmol), active carbon catalyst carrying 5% of platinum (WAKO PURE CHEMICAL, 153 mg) and toluene (20 mL) were added, and the mixture was heated in an oil bath at 80° C. under nitrogen atmosphere. The compound represented by above-mentioned Formula (d1-1) (20 g, 48.52 mmol) was added dropwise to the mixture. The reaction solution was stirred with magnetic stirrer for 90 minutes under heat. After allowing the mixture to cool, the mixture was filtered through a membrane filter (1 μm) with pressure to remove the catalyst. The solvent in the filtrate was evaporated, and the resultant was transferred to a 50 mL eggplant type flask. The resulting mixture was heated at 60° C. under stirring and under aspiration with the vacuum pump to remove low-boiling components, thereby obtaining the compound represented by Formula (a1-1) below.

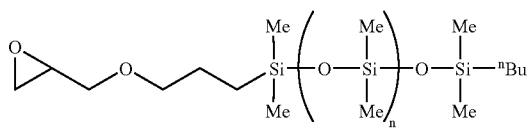

(a1-1)

By GPC analysis, no components having a molecular weight of more than 1000 were detected in the siloxanyl compound represented by Formula (a1-1). That is, it was proved that the siloxanyl compound represented by Formula (a1-1) did not contain a component in which the integer "n" was not less than 15.

Further, GC analysis revealed that the content of the siloxanyl compound represented by Formula (a1-1) was 97.5%. Further, in the siloxanyl compound represented by Formula (a1-1), no siloxanyl compounds other than that in which the integer "n" was 3 was detected. That is, the mode of the integer "n" in the siloxanyl compound was 3, and the percentage of the siloxanyl compound in which the integer "n" was 3 was 100%.

b. Example 2

To a 50 mL three-necked round bottom flask to which a thermometer and a Dimroth condenser were connected, the compound represented by Formula (a1-1) obtained in Example 1 (n=3) (6.57 g), sodium methacrylate (0.81 g), methacrylic acid (8.58 g), 4-methoxyphenol (0.0207 g) and water (0.09 g) were added, and the flask was immersed in an oil bath at 100° C., followed by stirring the mixture with magnetic stirrer for 4 hours. Hexane (15 mL) was added to the reaction solution, and the resultant was washed with 1N aqueous sodium hydroxide (30 mL) 3 times. The organic layer was collected and then washed with 2.45 weight % saline (30 mL) 3 times. To the organic layer, 4-t-butylcatechol (5 mg) was added, and the organic layer was dried over anhydrous sodium sulfate.

After removing the solids by filtration through a pleated filter, the filtrate was evaporated. The resultant was purified by silica gel column chromatography using 20 g of silica gel and using as a developing solvent a mixed solvent of hexane/ethyl acetate, thereby obtaining the mixture of the siloxanyl compound represented by Formula (a2-1-1) (n=3) below and the siloxanyl compound represented by Formula (a2-2-1) (n=3) below.

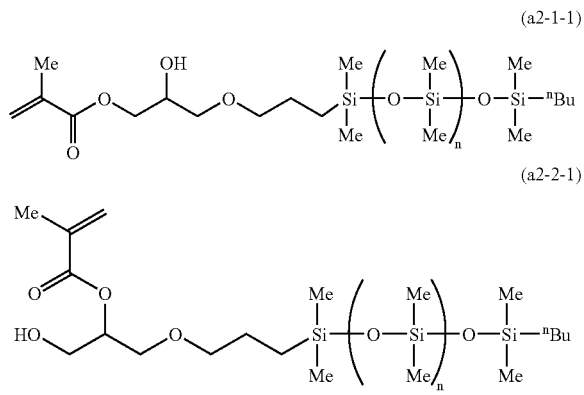

By GPC analysis, no components having a molecular weight of more than 1000 were detected in the siloxanyl compound represented by Formula (a2-1-1) and the siloxanyl compound represented by Formula (a2-2-1). That is, it was proved that the siloxanyl compound represented by Formula (a2-1-1) and the siloxanyl compound represented by Formula (a2-2-1) did not contain a component in which the integer "n" was not less than 15.

Further, GC analysis revealed that the content of the siloxanyl compound represented by Formula (a2-1-1) and the siloxanyl compound represented by Formula (a2-2-1) was 96% in total. Further, in the siloxanyl compound represented by Formula (a2-1-1) and the siloxanyl compound represented by Formula (a2-2-1), no siloxanyl compounds other than that in which the integer "n" was 3 was detected. That is, in the siloxanyl compound represented by Formula (a2-1-1) and the siloxanyl compound represented by Formula (a2-2-1), the mode of the integer "n" was 3, and in the total amount of siloxanyl compounds the percentage of the siloxanyl compounds in which the integer "n" was 3 was 100%.

c. Example 3

To a 1 L three-necked round bottom flask, a 200 mL dropping funnel and a three way stopcock were connected, and the three way stopcock was connected to a vacuum pump and to a nitrogen line. The resulting apparatus was heated with a heat gun while reducing the pressure in the apparatus with the vacuum pump, and then nitrogen was blown thereinto to restore the pressure to the normal pressure. This operation was repeated three times to remove the moisture in the apparatus. To the flask, hexamethylcyclotrisiloxane (22.25 g, 0.1 mol) and toluene (25.7 mL) were added, and the resulting mixture was stirred with a magnetic stirrer. After the hexamethylcyclotrisiloxane was completely dissolved, the flask was immersed in a water bath (room temperature), and 169 mL (0.27 mol) of 1.6 mol/L butyl lithium solution in hexane was added dropwise to the mixture for 35 minutes, followed by stirring the resulting mixture for 1 hour at room temperature. The flask was cooled in a NaCl-containing ice bath, and a solution prepared by dissolving hexamethylcyclotrisiloxane (133.5 g, 0.6 mol) in anhydrous tetrahydrofuran (165 mL) was added dropwise for 60 minutes. The resulting mixture was stirred for 150 minutes under the cooled condition and then stirred at room temperature for 45 minutes. Dimethylchlrosilane (39 mL) was dissolved in tetrahydrofuran (100 mL) and the solution was added dropwise to the mixture for 45 minutes, followed by stirring the resulting mixture for 1 hour. The solution was washed with about 400 mL of water 4 times (with totally about 1.6 L of water), and the organic layer was dried over anhydrous sodium sulfate. After removing the solids by filtration through a pleated filter, the filtrate was recovered in an eggplant type flask, and the solvent was evaporated. The resultant was purified with a semi-micro rectification apparatus (SOGO LABORATORY GLASS WORKS CO., LTD., catalogue No. 2004) to obtain the compound represented by Formula (d1-2) below. GC analysis revealed that the content of the compound was 98%.

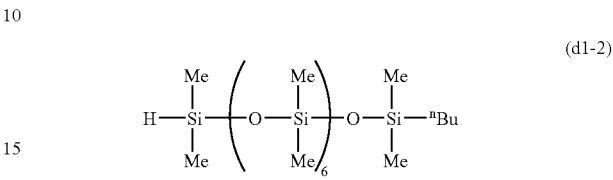

To a 200 mL three-necked round bottom flask to which a Dimroth condenser and a dropping funnel were connected, allylglycidyl ether (8.47 g, 74.21 mmol), active carbon catalyst carrying 5% of platinum (WAKO PURE CHEMICAL, 153 mg) and toluene (20 mL) were added, and the mixture was heated in an oil bath at 80° C. under nitrogen atmosphere. The compound represented by the above-mentioned Formula (d1-2) (30.8 g, 48.52 mmol) was added dropwise to the mixture. The reaction solution was stirred with magnetic stirrer for 90 minutes under heat. After allowing the mixture to cool, the mixture was filtered through a membrane filter (1 μm) with pressure to remove the catalyst. The solvent in the filtrate was evaporated, and the resultant was transferred to a 50 mL eggplant type flask. The resulting mixture was heated at 60° C. under stirring and under aspiration with the vacuum pump to remove low-boiling components, thereby obtaining the compound represented by Formula (a1-1) (n=6) below.

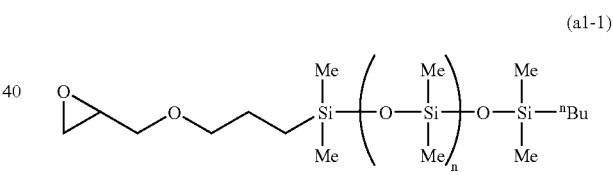

By GPC analysis, no components having a molecular weight of more than 1000 were detected in the siloxanyl compound represented by Formula (a1-1). That is, it was proved that the siloxanyl compound represented by Formula (a1-1) did not contain a component in which the integer "n" was not less than 15.

Further, GC analysis revealed that the content of the siloxanyl compound represented by Formula (a1-1) was 96%. Further, in the siloxanyl compound represented by Formula (a1-1), no siloxanyl compounds other than that in which the integer "n" was 6 was detected. That is, in the siloxanyl compound represented by Formula (a1-1), the mode of the integer "n" was 6, and the percentage of the siloxanyl compound in which the integer "n" was 6 was 100%.

d. Example 4

To a 50 mL three-necked round bottom flask to which a thermometer and a Dimroth condenser were connected, the compound represented by Formula (a1-1) obtained in Example 3 (n=6) (9.34 g), sodium methacrylate (0.81 g), methacrylic acid (8.58 g), 4-methoxyphenol (0.0207 g) and water (0.09 g) were added, and the flask was immersed in an oil bath at 100° C., followed by stirring the mixture with magnetic stirrer for 4 hours Hexane (15 mL) was added to the reaction solution, and the resultant was washed with 1N aqueous sodium hydroxide (30 mL) 3 times. The organic layer was collected and then washed with 2.45 weight % saline (30 mL) 3 times. To the organic layer, 4-t-butylcatechol (5 mg) was added, and the organic layer was dried over anhydrous sodium sulfate.

After removing the solids by filtration through a pleated filter, the filtrate was evaporated. The resultant was purified by silica gel column chromatography using 30 g of silica gel and using as a developing solvent a mixed solvent of hexane/ethyl acetate, thereby obtaining the mixture of the siloxanyl compound represented by Formula (a2-1-1) (n=6) below and the siloxanyl compound represented by Formula (a2-2-1) (n=6) below.

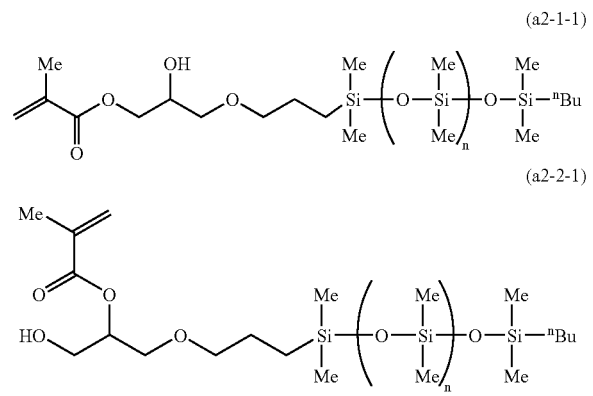

By GPC analysis, no components having a molecular weight of more than 1000 were detected in the siloxanyl compound represented by Formula (a2-1-1) and the siloxanyl compound represented by Formula (a2-2-1). That is, it was proved that the siloxanyl compound represented by Formula (a2-1-1) and the siloxanyl compound represented by Formula (a2-2-1) did not contain a component in which the integer "n" was not less than 15.

GC analysis revealed that the content of the siloxanyl compound represented by Formula (a2-1-1) and the siloxanyl compound represented by Formula (a2-2-1) was 96% in total. Further, in the siloxanyl compound represented by Formula (a2-1-1) and the siloxanyl compound represented by Formula (a2-2-1), no siloxanyl compounds other than that in which the integer "n" was 6 was detected. That is, in the siloxanyl compound represented by Formula (a2-1-1) and the siloxanyl compound represented by Formula (a2-2-1), the mode of the integer "n" was 6, and in the total amount of the siloxanyl compounds, the percentage of the siloxanyl compound of Formula (a2-1-1) in which the integer "n" was 6 and the siloxanyl compound of Formula (a2-2-1) in which the integer "n" was 6 was substantially 100%.

e. Example 5

To a 1 L three-necked round bottom flask, a 200 mL dropping funnel and a three way stopcock were connected, and the three way stopcock was connected to a vacuum pump and to a nitrogen line. The resulting apparatus was heated with a heat gun while reducing the pressure in the apparatus with the vacuum pump, and then nitrogen was blown thereinto to restore the pressure to the normal pressure. This operation was repeated three times to remove the moisture in the apparatus. To the flask, hexamethylcyclotrisiloxane (22.25 g, 0.1 mol) and toluene (25.7 mL) were added, and the resulting mixture was stirred with a magnetic stirrer. After the hexamethylcyclotrisiloxane was completely dissolved, the flask was immersed in a water bath (room temperature), and 169 mL (0.27 mol) of 1.6 mol/L butyl lithium solution in hexane was added dropwise to the mixture for 34 minutes, followed by stirring the resulting mixture for 1 hour at room temperature. The flask was cooled in an NaCl-containing ice bath, and a solution prepared by dissolving hexamethylcyclotrisiloxane (66.75 g, 0.3 mol) in anhydrous tetrahydrofuran (165 mL) was added dropwise for 60 minutes. The resulting mixture was stirred for 150 minutes under the cooled condition and then stirred at room temperature for 45 minutes. Dimethylchlorosilane (39 mL) was dissolved in tetrahydrofuran (100 mL) and the solution was added dropwise to the mixture for 45 minutes, followed by stirring the resulting mixture for 15 hours. The solution was washed with about 400 mL of water 4 times (with totally about 1.6 L of water), and the organic layer was dried over anhydrous sodium sulfate. After removing the solids by filtration through a pleated filter, the filtrate was recovered in an eggplant type flask, and the solvent was evaporated. The resultant was purified by vacuum distillation to obtain the mixture containing as a main component the compound represented by Formula (d1-1) below.

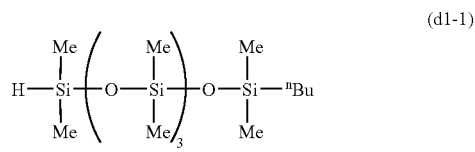

To a 200 mL three-necked round bottom flask to which a Dimroth condenser and a dropping funnel were connected, allylglycidyl ether (8.47 g, 74.21 mmol), active carbon catalyst carrying 5% of platinum (WAKO PURE CHEMICAL, 153 mg) and toluene (20 mL) were added, and the mixed solution was heated in an oil bath at 80° C. under nitrogen atmosphere. The mixture (20 g, 48.52 mmol) containing as a main component the compound represented by Formula (d1-1) obtained in above-described (1) was added dropwise to the mixed solution. The reaction solution was stirred with magnetic stirrer for 90 minutes under heat. After allowing the mixture to cool, the mixture was filtered through a membrane filter (1 μm) with pressure to remove the catalyst. The solvent in the filtrate was evaporated, and the resultant was transferred to a 50 mL eggplant type flask. The resulting mixture was heated at 60° C. under stirring and under aspiration with the vacuum pump to remove low-boiling components, thereby obtaining the mixture containing as a main component the compound represented by Formula (a1-1) (n=3) below.

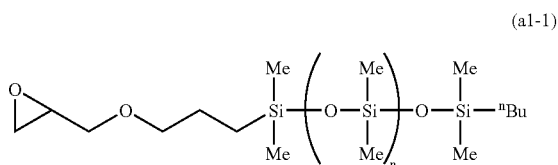

By GPC analysis, no components having a molecular weight of more than 1000 were detected in the siloxanyl compound represented by Formula (a1-1). That is, it was proved that the siloxanyl compound represented by Formula (a1-1) did not contain a component in which the integer "n" was not less than 15.

Further, GC analysis revealed that the content of the siloxanyl compound represented by Formula (a1-1) was 92%. Further, the mode of the integer "n" in the siloxanyl compound represented by Formula (a1-1) was 3, and the percentage of the siloxanyl compound in which the integer "n" was 3 was 90%.

f. Example 6

To a 50 mL three-necked round bottom flask to which a thermometer and a Dimroth condenser were connected, the mixture (6.57 g) containing as a main component the compound represented by Formula (a1-1) (n=3) obtained in Example 5, sodium methacrylate (0.81 g), methacrylic acid (8.58 g), 4-methoxyphenol (0.0207 g) and water (0.09 g) were added, and the flask was immersed in an oil bath at 100° C., followed by stirring the mixture with magnetic stirrer for 4 hours. Hexane (15 mL) was added to the reaction solution, and the resultant was washed with 1N aqueous sodium hydroxide (30 mL) 3 times. The organic layer was collected and then washed with 2.45 weight % saline (30 mL) 3 times. To the organic layer, 4-t-butylcatechol (5 mg) was added, and the organic layer was dried over anhydrous sodium sulfate.

After removing the solids by filtration through a pleated filter, the filtrate was evaporated. The resultant was purified by silica gel column chromatography using 20 g of silica gel and using as a developing solvent a mixed solvent of hexane/ethyl acetate, thereby obtaining the mixture containing as main components the siloxanyl compound represented by Formula (a2-1-1) (n=3) below and the siloxanyl compound represented by Formula (a2-2-1) (n=3) below.

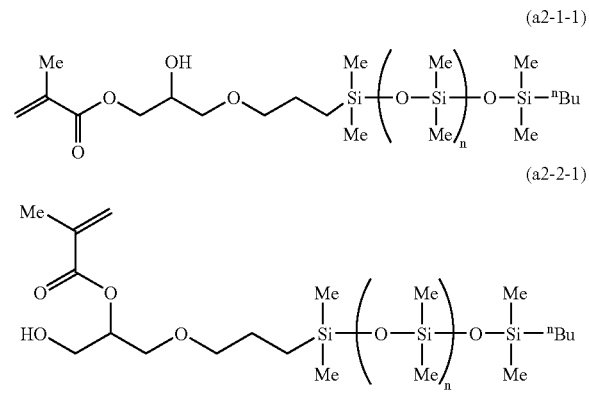

By GPC analysis, no components having a molecular weight of more than 1000 were detected in the mixture containing as main components the siloxanyl compound represented by Formula (a2-1-1) (n=3) and the siloxanyl compound represented by Formula (a2-2-1) (n=3). That is, it was proved that the siloxanyl compound represented by Formula (a2-1-1) and the siloxanyl compound represented by Formula (a2-2-1) did not contain a component in which the integer "n" was not less than 15.

Further, GC analysis revealed that the content of the siloxanyl compound represented by Formula (a2-1-1) and the siloxanyl compound represented by Formula (a2-2-1) was 92% in total. Further, the mode of the integer "n" in each siloxanyl compound was 3, and in the total amount of the siloxanyl compounds, the percentage of the siloxanyl compound of Formula (a2-1-1) in which the integer "n" was 3 and the siloxanyl compound of Formula (a2-2-1) in which the integer "n" was 3 was 90%.

g. Reference Example 1

The same procedure as in Example 1 (2) was carried out except that the compound represented by Formula (d1-3) (manufactured by GELEST INC., 48.52 mmol) was used in place of the compound represented by above-mentioned Formula (d1-1) (48.52 mmol) to obtain the compound represented by Formula (a1-2) (n=1) below.

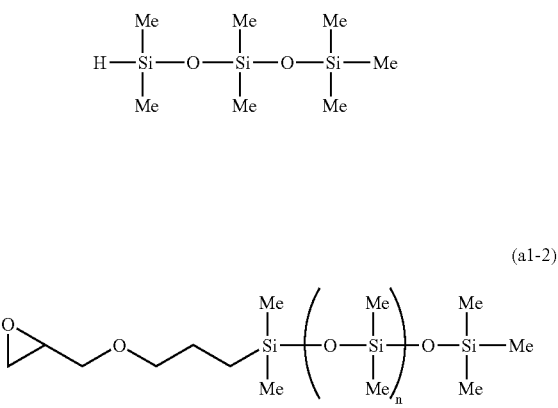

GC analysis revealed that the content of the siloxanyl compound represented by Formula (a1-2) was 98%. Further, in the siloxanyl compound represented by Formula (a1-12), the percentage of the siloxanyl compound in which the integer "n" was 1 was substantially 100%.

Further, by GPC analysis, no components having a molecular weight of more than 1000 were detected in the siloxanyl compound represented by Formula (a1-2). That is, it was proved that the siloxanyl compound represented by Formula (a1-2) did not contain a component in which the integer "n" was not less than 15.

h. Reference Example 2

The same procedure as in Example 2 was carried out except that the compound represented by Formula (a1-2) (n=1) (4.20 g) obtained in Reference Example 1 was used in place of the compound represented by above-mentioned Formula (a1-1) (n=3) (6.57 g) to obtain the mixture of the siloxanyl compound represented by Formula (a2-1-2) (n=1) below and the siloxanyl compound represented by Formula (a2-2-2) (n=1) below.

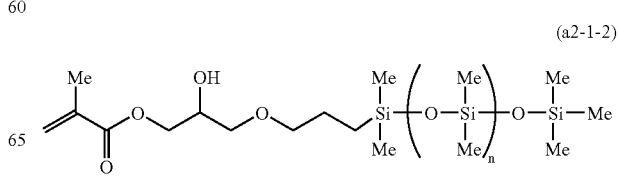

-continued

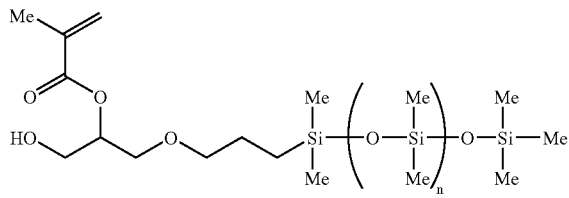

(a2-2-2)

By GPC analysis, no components having a molecular weight of more than 1000 were detected in the siloxanyl compound represented by Formula (a2-1-2) and the siloxanyl compound represented by Formula (a2-2-2). That is, it was proved that the siloxanyl compound represented by Formula (a2-1-2) and the siloxanyl compound represented by Formula (a2-2-2) did not contain a component in which the integer "n" was not less than 15.

Further, GC analysis revealed that the content of the siloxanyl compound represented by Formula (a2-1-2) and the siloxanyl compound represented by Formula (a2-2-2) was 97% in total. Further, in the siloxanyl compound represented by Formula (a2-1-2) and the siloxanyl compound represented by Formula (a2-2-2), no siloxanyl compounds other than that in which the integer "n" was 1 was detected. That is, in the siloxanyl compound represented by Formula (a2-1-2) and the siloxanyl compound represented by Formula (a2-2-2), the mode of the integer "n" was 1, and in the total amount of the siloxanyl compounds, the percentage of the siloxanyl compound of Formula (a2-1-2) in which the integer "n" was 1 and the siloxanyl compound of Formula (a2-2-2) in which the integer "n" was 1 was 100%.

i. Reference Example 3

To a 1 L three-necked round bottom flask, a 200 mL dropping funnel and a three way stopcock were connected, and the three way stopcock was connected to a vacuum pump and to a nitrogen line. The resulting apparatus was heated with a heat gun while reducing the pressure in the apparatus with the vacuum pump, and then nitrogen was blown thereinto to restore the pressure to the normal pressure. This operation was repeated three times to remove the moisture in the apparatus. To the flask, hexamethylcyclotrisiloxane (22.25 g, 0.1 mol) and toluene (25.7 mL) were added, and the resulting mixture was stirred with a magnetic stirrer. After the hexamethylcyclotrisiloxane was completely dissolved, the flask was immersed in a water bath (room temperature), and 169 mL (0.27 mol) of 1.6 mol/L butyl lithium solution in hexane was added dropwise to the mixture for 34 minutes, followed by stirring the resulting mixture for 1 hour at room temperature. The flask was cooled in an NaCl-containing ice bath, and a solution prepared by dissolving hexamethylcyclotrisiloxane (333.7 g, 1.5 mol) in anhydrous tetrahydrofuran (165 mL) was added dropwise for 60 minutes. The resulting mixture was stirred for 150 minutes under the cooled condition and then stirred at room temperature for 45 minutes. Dimethylchlorosilane (39 mL) was dissolved in tetrahydrofuran (100 mL) and the solution was added dropwise to the mixture for 45 minutes, followed by stirring the resulting mixture for 1 hour. The solution was washed with about 400 mL of water 4 times (with totally about 1.6 L of water), and the organic layer was dried over anhydrous sodium sulfate. After removing the solids by filtration through a pleated filter, the filtrate was recovered in an eggplant type flask, and the solvent was evaporated. The resultant was heated under reduced pressure to remove low-boiling components, thereby obtaining the mixture containing as a main component the compound represented by Formula (d1-4) below.

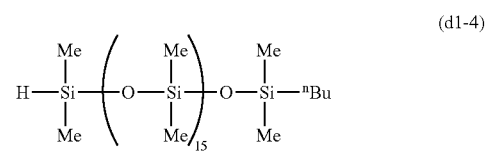

(d1-4)

To a 200 mL three-necked round bottom flask to which a Dimroth condenser and a dropping funnel were connected, allylglycidyl ether (8.47 g, 74.21 mmol), active carbon catalyst carrying 5% of platinum (WAKO PURE CHEMICAL, 153 mg) and toluene (20 mL) were added, and the mixed solution was heated in an oil bath at 80° C. under nitrogen atmosphere. The mixture (63 g, 48.5 mmol) containing as a main component the compound represented by above-mentioned Formula (d1-4) was added dropwise to the mixed solution. The reaction solution was stirred with magnetic stirrer for 90 minutes under heat. After allowing the mixture to cool, the mixture was filtered through a membrane filter (1 μm) with pressure to remove the catalyst. The solvent in the filtrate was evaporated, and the resultant was transferred to a 50 mL eggplant type flask. The resulting mixture was heated at 60° C. under stirring and under aspiration with the vacuum pump to remove low-boiling components, thereby obtaining the mixture containing as a main component the compound represented by Formula (a1-1) (n=15) below.

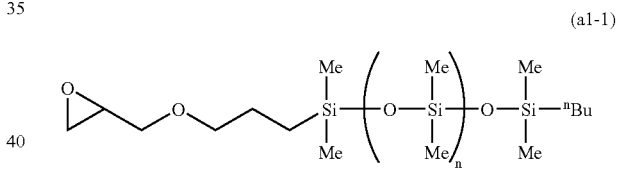

(a1-1)

GPC analysis and MALDI-TOFMS analysis revealed that the content of the siloxanyl compound represented by Formula (a1-1) was 83%. Further, the siloxanyl compound had a variety of the integer n in a range from 6 to 30, and the mode of the integer n in the siloxanyl compound was 15. Further, GPC analysis revealed that the percentage of the siloxanyl compound in which the integer n was 15 was 51%.

j. Reference Example 4

To a 50 mL three-necked round bottom flask to which a thermometer and a Dimroth condenser were connected, the mixture (17.7 g) containing as a main component the compound represented by Formula (a1-1) (n=15) obtained in Reference Example 3, sodium methacrylate (0.81 g), methacrylic acid (8.58 g), 4-methoxyphenol (0.0207 g) and water (0.09 g) were added, and the flask was immersed in an oil bath at 100° C., followed by stirring the mixture with magnetic stirrer for 4 hours. Hexane (15 mL) was added to the reaction solution, and the resultant was washed with 1N aqueous sodium hydroxide (30 mL) 3 times. The organic layer was collected and then washed with 2.45 weight % saline (30 mL) 3 times. To the organic layer, 4-t-butylcatechol (5 mg) was added, and the organic layer was dried over anhydrous sodium sulfate.

After removing the solids by filtration through a pleated filter, the filtrate was evaporated. The resultant was purified by silica gel column chromatography using 20 g of silica gel and using as a developing solvent a mixed solvent of hexane/ethyl acetate, thereby obtaining a mixture containing as main components the siloxanyl compound represented by Formula (a2-1-1) (n=15) below and the siloxanyl compound represented by Formula (a2-2-1) (n=15) below.

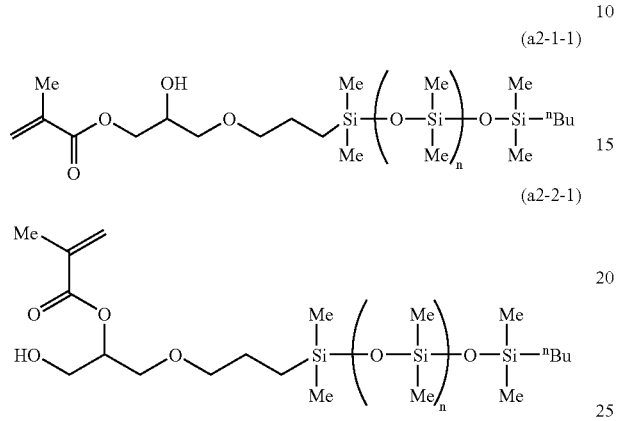

GPC analysis and MALDI-TOFMS analysis revealed that the content of the siloxanyl compound represented by Formula (a2-1-1) and the siloxanyl compound represented by Formula (a2-2-1) was 80% in total. Further, the siloxanyl compound represented by Formula (a2-1-1) and the siloxanyl compound represented by Formula (a2-2-1) had a variety of the integer n in a range from 6 to 30, and the mode of the integer n in each siloxanyl compound was 15. GPC analysis revealed that the percentage of the siloxanyl compounds in which the integer n was 15 was 53%.

k. Reference Example 5

To a 300 mL eggplant type flask, epoxysilane (100 g) represented by Formula (a1-3) below, methacrylic acid (51.7 g), sodium methacrylate (9.6 g) and p-methoxyphenol (5.5 g) were added, and the resulting mixture was heated to 100° C. and stirred under air atmosphere.

After confirming by GC analysis that the area % of the epoxysilane represented by Formula (a1-3) reached to not more than 0.1%, the reaction solution was cooled to room temperature. To the reaction solution, 150 mL of hexane was added. The solution was washed with 1N aqueous sodium hydroxide (250 mL) 3 times and then washed with 2.45% saline (175 mL) 3 times. The organic layer was dried over anhydrous sodium sulfate, followed by filtration, and then the solvent was evaporated. The resultant was purified by silica gel column chromatography using silica gel in an amount of 4 times that of the crude product and using as a developing solvent a mixed solvent of hexane/ethyl acetate, thereby obtaining the mixture of the siloxanyl compound represented by Formula (a2-1-3) below and the siloxanyl compound represented by Formula (a2-2-3) below.

GC analysis revealed that the content of the siloxanyl compound represented by Formula (a2-1-3) and the siloxanyl compound represented by Formula (a2-2-3) was 96% in total. Further, in the siloxanyl compound represented by Formula (a2-1-3) and the siloxanyl compound represented by Formula (a2-2-3), no analogues having different number of silicons were detected.

Further, by GPC analysis, no components having a molecular weight of more than 1000 were detected in the siloxanyl compound represented by Formula (a2-1-3) and the siloxanyl compound represented by Formula (a2-2-3).

l. Example 7

The material (31.6 parts by weight) for producing molded plastics obtained in Example 2, the mixture (28.6 parts by weight) of siloxanyl compound represented by Formula (a2-1-3) and siloxanyl compound represented by Formula (a2-2-3) obtained in Reference Example 5, 2-hydroxyethyl methacrylate (6.1 parts by weight), N,N-dimethylacrylamide (24.5 parts by weight), tetraethylene glycol dimethacrylate (1 part by weight) and polyvinyl pyrrolidone (K90) (7.1 parts by weight), and as solvents 3,7-dimethyl-3-octanol (17 parts by weight) and CGI1850 (CIBA, 1.02 parts by weight) were mixed and stirred to obtain a homogeneous and clear mixture of monomers. The monomer mixture was degassed under argon atmosphere. This monomer mixture was poured into a mold for contact lens, which was made of a transparent plastic ("Topas", manufactured by TICONA POLYMERS), in a glove box under nitrogen atmosphere, and the mold was irradiated with light (45° C., for 20 minutes) using Philips TL20W/03T UV lamp to polymerize the monomers, thereby obtaining a contact lens-shaped sample. The obtained lens-shaped sample was taken out from the mold in a 50:50 (weight) mixture of isopropyl alcohol and water. The sample was dipped in isopropyl alcohol, then in 50:50 (weight) mixture of isopropyl alcohol and water, and then in water. Finally, the sample was sealed in a vial container filled with borate buffer (pH7.1 to 7.3). The vial container was autoclaved for 30 minutes at 120° C. The physical properties of the thus obtained sample are shown in Table 1.

m. Example 8

The same procedure as in Example 7 was carried out except that the material for producing molded plastics shown in Table 1 was used in place of that obtained in Example 2 to obtain a contact lens-shaped sample. The physical properties of the thus obtained sample are shown in Table 1.

n. Example 9

The same procedure as in Example 7 was carried out except that the material for producing molded plastics shown in Table 1 was used in place of that obtained in Example 2 to obtain a contact lens-shaped sample. The physical properties of the thus obtained sample were shown in Table 1. This sample had a few drawbacks in optical uniformity when compared with one obtained in Example 7.

o. Comparative Example 1

The same procedure as in Example 7 was carried out except that the source material for molded-plastic shown in Table 1 was used in place of that obtained in Example 2 to obtain a contact lens-shaped sample. The physical properties of the thus obtained sample were shown in Table 1. The oxygen permeability of this sample was lower than that of those obtained in Examples 7 to 9.

p. Comparative Example 2

The same procedure as in Example 7 was carried out except that the source material for molded-plastic shown in Table 1 was used in place of that obtained in Example 2 to obtain a contact lens-shaped sample. The physical properties of the thus obtained sample were shown in Table 1. The optical uniformity of this sample was worse than that of those obtained in Examples 7 to 9.

q. Comparative Example 3

The same procedure as in Example 7 was carried out except that the source material for molded-plastic shown in Table 1 was used in place of that obtained in Example 2 to obtain a contact lens-shaped sample. The physical properties of the thus obtained sample were shown in Table 1. The oxygen permeability of this sample was lower than that of those obtained in Examples 7 and 8, and the modulus of elasticity of it was higher than that of those obtained in Examples 7 to 9.

r. Reference Example 10

To a 1 L three-necked round bottom flask, methacrylic acid (241.2 g), allylglycidyl ether (80.3 g), sodium methacrylate (22.7 g) and 4-methoxyphenol (1.14 g) were added, and the mixture was stirred with a mechanical stirrer. The flask was immersed in an oil bath to raise the temperature to 100° C., and the mixture was stirred for 4 hours under heat while tracing the reaction by gas chromatography (GC) analysis. After allowing the mixture to cool, toluene (300 mL) was added, and the resulting mixture was transferred to a 1 L separatory funnel. The mixture was washed with 0.5N aqueous sodium hydroxide solution (300 mL) 7 times and then with saturated saline (300 mL) 3 times. The organic layer was collected and dried over anhydrous sodium sulfate overnight. After removing the solids by filtration, the filtrate was recovered in a 1 L eggplant type flask, and the solvent was evaporated. The resultant was then transferred to a 500 mL eggplant type flask, and 2,6-di-t-butyl-4-methylphenol (0.23 g) was added thereto, followed by further concentration of the resultant (yield: 226.74 g). To the resultant, aluminum N-nitrosophenylhydroxylamine (0.23 g) was added, followed by distillation under reduced pressure, thereby obtaining the material for producing molded plastics, characterized by containing the compound represented by Formula (F1-1) or Formula (F1-2) below.

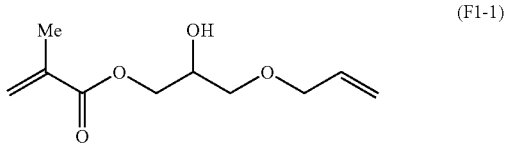

(F1-1)

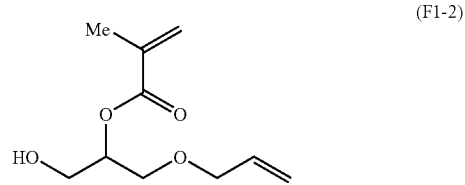

(F1-2)

s. Example 10

To a 200 mL three-necked round bottom flask to which a Dimroth condenser was connected, which Dimroth condenser is connected to a nitrogen line, the mixture (50 g) of the compound represented by Formula (F1-1) and the compound represented by Formula (F1-2) obtained in Reference Example 10, hexamethyldisilazane (24.34 g), 2,6-di-t-butyl-4-methylphenol (0.161 g) and saccharin (0.148 g) were added, and the resulting mixture was heated in an oil bath at 100° C. under stirring with a magnetic stirrer. Ammonia gas was generated during heating. Forty five minutes later heating and stirring were stopped and the mixture was allowed to cool to room temperature, followed by filtering the reaction solution to remove the solids. To the resultant, 2,6-di-t-butyl-4-methylphenol (0.32 g) and aluminum N-nitrosophenylhydroxylamine (0.32 g) were added, followed by distillation under reduced pressure, thereby obtaining the material for producing molded plastics, characterized by containing the

TABLE 1

|  | Example 7 | Example 8 | Example 9 | Comparative Example 1 | Comparative Example 2 | Comparative Example 3 |
|---|---|---|---|---|---|---|
| Material for Producing Molded Plastics | obtained in Example 2 | obtained in Example 4 | obtained in Example 6 | obtained in Reference Example 2 | obtained in Reference Example 4 | obtained in Reference Example 5 |
| Oxygen Permeability Coefficient ×10$^{-11}$(cm$^2$/sec)mLO$_2$/(mL · hPa) | 72 | 83 | 72 | 56 | 77 | 55 |
| Moisture Content (%) | 40 | 39 | 40 | 32 | 38 | 30 |
| Modulus of Elasticity (MPa) | 0.81 | 0.72 | 0.80 | 1.0 | 0.77 | 1.2 |
| Optical Nonuniformity | A | A | B | A | C | A | compound represented by Formula (F2-1) or Formula (F2-2) below. GC analysis revealed that the content of the compound was 97%.

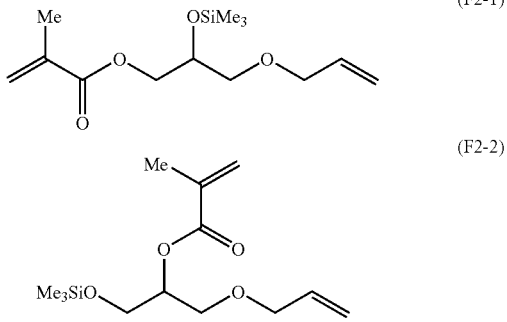

(F2-1)

(F2-2)

t. Reference Example 11

To a 1 L three-necked round bottom flask, a 200 mL dropping funnel and a three way stopcock were connected, and the three way stopcock was connected to a vacuum pump and to a nitrogen line. The resulting apparatus was heated with a heat gun while reducing the pressure in the apparatus with the vacuum pump, and then nitrogen was blown thereinto to restore the pressure to the normal pressure. This operation was repeated three times to remove the moisture in the apparatus. To the flask, hexamethylcyclotrisiloxane (22.25 g, 0.1 mol) and toluene (25.7 mL) were added, and the resulting mixture was stirred with a magnetic stirrer. After the hexamethylcyclotrisiloxane was completely dissolved, the flask was immersed in a water bath (room temperature), and 169 mL (0.27 mol) of 1.6 mol/L butyl lithium solution in hexane was added dropwise to the mixture for 34 minutes, followed by stirring the resulting mixture for 1 hour at room temperature. The flask was cooled in a NaCl-containing ice bath, and a solution prepared by dissolving hexamethylcyclotrisiloxane (66.75 g, 0.3 mol) in anhydrous tetrahydrofuran (165 mL) was added dropwise for 60 minutes. The resulting mixture was stirred for 150 minutes under the cooled condition and then stirred at room temperature for 45 minutes. Dimethylchlrosilane (39 mL) was dissolved in tetrahydrofuran (100 mL) and the solution was added dropwise to the mixture for 45 minutes, followed by stirring the resulting mixture for 1 hour. The solution was washed with about 400 mL of water 4 times (with totally about 1.6 L of water), and the organic layer was dried over anhydrous sodium sulfate. After removing the solids by filtration through a pleated filter, the filtrate was recovered in an eggplant type flask, and the solvent was evaporated. The resultant was purified with a semi-micro rectification apparatus (SOGO LABORATORY GLASS WORKS CO., LTD., catalogue No. 2004) to obtain the compound represented by Formula (F3) below (GC purity: 99%).

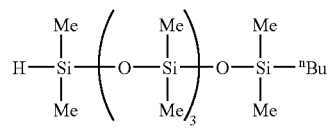

(F3)

u. Example 11

To a 200 mL eggplant type flask, the mixture (3.96 g) of the compound represented by Formula (F2-1) and the compound represented by Formula (F2-2) obtained in Example 10, toluene (4 mL), active carbon catalyst carrying 5% of platinum (WAKO PURE CHEMICAL, 308 mg) and a magnet bar were added, and a Dimroth condenser, to which a calcium chloride tube was connected at an upper portion thereof, was connected to the flask. The resulting mixture was heated to 80° C. under nitrogen atmosphere and under making the cooling water flow through the condenser. After the temperature of the mixture reached to 80° C., the compound (4.0 g) represented by Formula (F3) obtained in Reference Example 11 was slowly added dropwise to the mixture with a Pasteur pipette. After the reaction was completed, the mixture was filtered through Celite to remove the catalyst. Briefly, the reaction solution was filtered through Celite-535 together with hexane under reduced pressure using a Kiriyama funnel in which a filter paper was placed, the funnel being loaded with Celite-535 up to half the depth of the funnel. The filtrate was then concentrated with a rotatory evaporator (water bath: 40° C.). The concentrated reaction solution was transferred to a wide-necked, eggplant type flask (100 mL), and aluminum N-nitrosophenylhydroxylamine was added thereto as a polymerization inhibitor at a concentration of about 0.1 weight % of the reaction solution. Then a magnet bar was added to the flask and the flask was fixed to a stand. The pressure in the flask was reduced with a vacuum pump at room temperature until substantially no bubbles were generated in the solution. After opening the upper valve fully, the reaction solution was heated to 140° C. by immersing the flask containing the reaction solution in an oil bath, and then low-boiling components were removed by aspiration with a vacuum pump under stirring the reaction solution for 1 hour, thereby obtaining the material for producing molded plastics, characterized by containing the compound represented by Formula (F4-1) or Formula (F4-2) below. GC analysis revealed that the content of the compound represented by Formula (F4-1) and the compound represented by Formula (F4-2) in all components of the obtained material (i.e., purity) was 96%. The number of the peaks observed in GC was 18, and there were very few impurities in the obtained material.

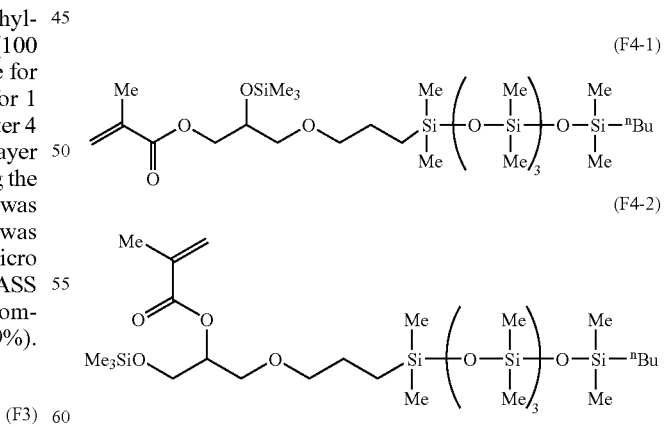

(F4-1)

(F4-2)

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising siloxanyl compounds comprising the structures:

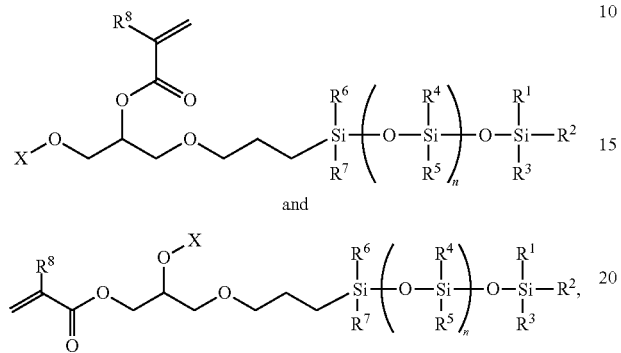

and wherein $R^1$ to $R^7$ independently represent hydrogen, $C_1$-$C_{18}$ alkyl, or phenyl;
wherein n represents an integer of 0 or more;
wherein the mode of the integer is from 3 to 9;
wherein the molar percentage of the compound in which the integer "n" is the mode in the total of the siloxanyl compounds represented by the Formula is at least about 90%;
wherein $R^8$ is hydrogen or methyl;
wherein X is hydrogen or a hydrolyzable group; and
wherein an epoxide moiety or a diol moiety is present in a concentration of less than about 100 ppm.

2. The composition of claim 1, wherein the content of the compound in the composition is at least about 92% by weight.

3. The composition of claim 1, wherein an epoxide moiety or a diol moiety is substantially absent from the composition.

4. The composition of claim 1, wherein $R^1$ represents n-butyl and wherein $R^2$ to $R^7$ independently represent $C_1$-$C_4$ alkyl.

5. The composition of claim 1, wherein $R^1$ represents n-butyl and wherein $R^2$ to $R^7$ independently represent methyl.

6. A composition comprising a polymer comprising residues of:

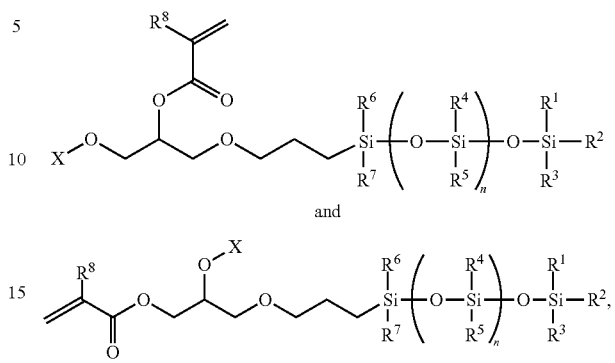

and wherein $R^1$ to $R^7$ independently represent hydrogen, $C_1$-$C_{18}$ alkyl, or phenyl;
wherein n represents an integer of 0 or more;
wherein the mode of the integer is from 3 to 9;
wherein the molar percentage of the residues in the polymer in which the integer "n" is the mode in the total of the siloxanyl residues represented by the Formula is at least about 90%;
wherein an epoxide moiety or a diol moiety is present in a concentration of less than about 100 ppm;
wherein X is hydrogen or a hydrolyzable group; and
wherein $R^8$ is hydrogen or methyl.

7. The composition of claim 6, wherein the content of the polymer in the composition is at least about 92% by weight.

8. The composition of claim 6, wherein the polymer is a copolymer comprising residues of 2-hydroxyethyl methacrylate.

9. A molded article, ophthalmic lens, or contact lens comprising the composition of claim 1.

10. A molded article, ophthalmic lens, or contact lens comprising the composition of claim 6.

11. The composition of claim 6, wherein $R^1$ represents n-butyl and wherein $R^2$ to $R^7$ independently represent $C_1$-$C_4$ alkyl.

12. The composition of claim 6, wherein $R^1$ represents n-butyl and wherein $R^2$ to $R^7$ independently represent methyl.

* * * * *